US012487448B2

(12) United States Patent
Abe et al.

(10) Patent No.: US 12,487,448 B2
(45) Date of Patent: Dec. 2, 2025

(54) SCANNING OPTICAL DEVICE

(71) Applicant: BROTHER KOGYO KABUSHIKI KAISHA, Nagoya (JP)

(72) Inventors: Koji Abe, Okazaki (JP); Yoshihiro Oyama, Tokai (JP); Junichi Yokoi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 343 days.

(21) Appl. No.: 18/061,441

(22) Filed: Dec. 3, 2022

(65) Prior Publication Data

US 2023/0176365 A1 Jun. 8, 2023

(30) Foreign Application Priority Data

Dec. 6, 2021 (JP) .................. 2021-197606
Dec. 6, 2021 (JP) .................. 2021-197607

(51) Int. Cl.
*G02B 26/12* (2006.01)
(52) U.S. Cl.
CPC ......... *G02B 26/125* (2013.01); *G02B 26/124* (2013.01)
(58) Field of Classification Search
CPC .... G02B 26/10; G02B 26/123; G02B 26/124; G02B 26/125
See application file for complete search history.

(56) References Cited

U.S. PATENT DOCUMENTS

| 5,267,075 A | 11/1993 | Yamaguchi et al. |
| 6,683,707 B2 * | 1/2004 | Ishihara ............... G02B 26/125 347/256 |

(Continued)

FOREIGN PATENT DOCUMENTS

| JP | 5-19195 A | 1/1993 |
| JP | 7-68836 A | 3/1995 |

(Continued)

OTHER PUBLICATIONS

D.L. Buddington et al., Modular Four Mirror Scanning Optical System, 1976, pp. 1-2 [online], [retrieved Mar. 4, 2025], retrieved from the Internet <URL: https://priorart.ip.com/IPCOM/000086383>. (Year: 1976).*

(Continued)

*Primary Examiner* — Jennifer D. Carruth
(74) *Attorney, Agent, or Firm* — Merchant & Gould P.C.

(57) ABSTRACT

A scanning optical device includes a semiconductor laser, a coupling lens, a condenser lens, a deflector, a scanning optical system, a frame, and a first cover. The coupling lens converts light emitted by the first semiconductor laser to a light beam. The light beam received from the coupling lens is concentrated through the condenser lens. The deflector includes a polygon mirror configured to deflect the light beam received from the condenser lens. The scanning optical system directs the light beam deflected by the deflector toward an image plane. The deflector and the scanning optical system are fixed to the frame. The first cover covers at least a portion of the frame on which the deflector is located. The frame includes a wall having an opening through which a light beam traveling toward the polygon mirror passes. The condenser lens closes the opening.

20 Claims, 15 Drawing Sheets

(56) References Cited

U.S. PATENT DOCUMENTS

| | | | |
|---|---|---|---|
| 7,446,917 B2 * | 11/2008 | Tomita | B41J 2/471 |
| | | | 359/204.1 |
| 7,643,191 B2 | 1/2010 | Okuwaki et al. | |
| 7,791,632 B2 * | 9/2010 | Igarashi | G03G 15/326 |
| | | | 347/256 |
| 7,911,669 B2 * | 3/2011 | Shimomura | G02B 26/105 |
| | | | 359/215.1 |
| 8,207,997 B2 * | 6/2012 | Igarashi | G02B 26/123 |
| | | | 347/261 |
| 8,446,447 B2 * | 5/2013 | Kato | G03G 21/1666 |
| | | | 347/256 |
| 8,634,123 B2 | 1/2014 | Kato et al. | |
| 10,274,858 B2 | 4/2019 | Fukuhara | |
| 10,451,870 B2 | 10/2019 | Okada et al. | |
| 11,726,316 B2 | 8/2023 | Sano et al. | |
| 12,147,032 B1 | 11/2024 | Sano et al. | |
| 2006/0139715 A1 * | 6/2006 | Tamaru | G02B 26/123 |
| | | | 347/243 |
| 2007/0127105 A1 * | 6/2007 | Igarashi | G02B 26/125 |
| | | | 359/205.1 |
| 2008/0130078 A1 | 6/2008 | Okuwaki et al. | |
| 2009/0058981 A1 * | 3/2009 | Higaki | G02B 26/125 |
| | | | 347/243 |
| 2009/0073530 A1 | 3/2009 | Kato et al. | |
| 2010/0182669 A1 * | 7/2010 | Igarashi | G02B 26/125 |
| | | | 359/204.1 |
| 2012/0307329 A1 * | 12/2012 | Sugiyama | G02B 26/123 |
| | | | 359/204.1 |
| 2016/0139533 A1 | 5/2016 | Nakatsu | |
| 2018/0113396 A1 | 4/2018 | Fukuhara | |
| 2018/0231770 A1 | 8/2018 | Okada et al. | |
| 2018/0239128 A1 * | 8/2018 | Ominato | G03G 15/28 |
| 2021/0033852 A1 | 2/2021 | Sano et al. | |
| 2023/0341678 A1 | 10/2023 | Sano et al. | |

FOREIGN PATENT DOCUMENTS

| | | | | |
|---|---|---|---|---|
| JP | 1996201717 A | * | 8/1996 | |
| JP | 10-232360 A | | 9/1998 | |
| JP | 11-183818 A | | 7/1999 | |
| JP | 2005-62257 A | | 3/2005 | |
| JP | 2006-146101 A | | 6/2006 | |
| JP | 2008-102291 A | | 5/2008 | |
| JP | 2009-69595 A | | 4/2009 | |
| JP | 2010156755 A | * | 7/2010 | |
| JP | 2011-186495 A | | 9/2011 | |
| JP | 2013-117569 A | | 6/2013 | |
| JP | 2013-164536 A | | 8/2013 | |
| JP | 2015-206910 A | | 11/2015 | |
| JP | 2016-99363 A | | 5/2016 | |
| JP | 2018-69727 A | | 5/2018 | |
| JP | 2018-132639 A | | 8/2018 | |
| JP | 2021-26038 A | | 2/2021 | |

OTHER PUBLICATIONS

Easier English Student Dictionary 142 (2003). (Year: 2003).*
What's the Difference between Bolts and Screws?, 2017, pp. 1-3 [online], [retrieved Mar. 3, 2025], retrieved from the Internet <URL: https://monroeengineering.com/blog/bolts-vs-screws-whats-the-difference/>. (Year: 2017).*
Ross Team, Use Cases for Cylinder Lenses, 2019, pp. 1-7 [online], [retrieved Feb. 27, 2025], retrieved from the Internet <URL: https://blog.rossoptical.com/blog/use-cases-for-cylinder-lenses>. (Year: 2019).*

* cited by examiner

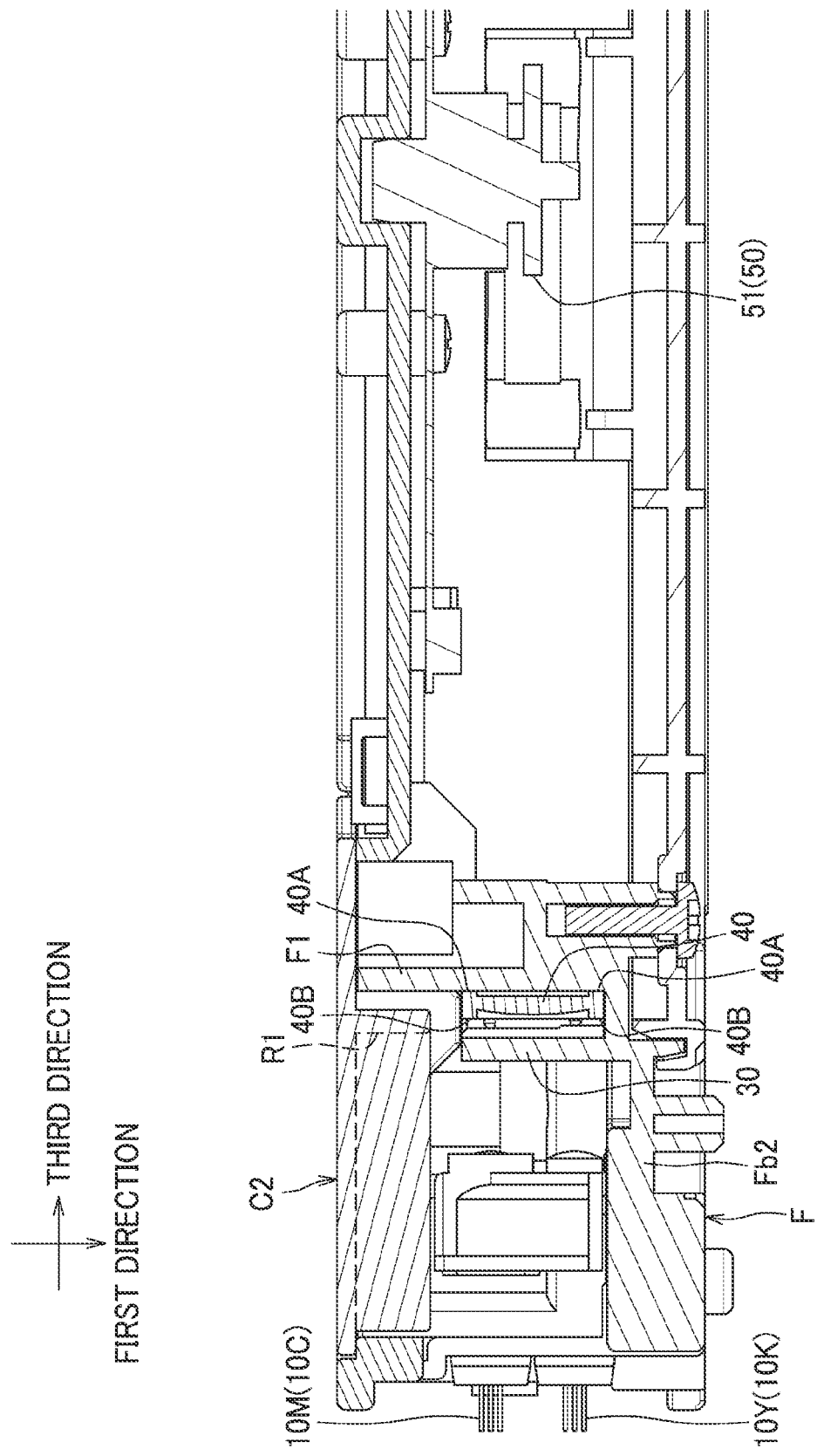

SCANNING OPTICAL DEVICE

REFERENCE TO RELATED APPLICATIONS

This application claims priority from Japanese Patent Application Nos. 2021-197607 and 2021-197606 filed on Dec. 6, 2021. The entire contents of the priority applications are incorporated herein by reference.

BACKGROUND ART

A scanning optical device known in the art comprises a semiconductor laser, a coupling lens, a deflector, a scanning optical system, and a frame. The coupling lens converts light emitted by the semiconductor laser to a light beam. The deflector includes a polygon mirror that deflects the light beam received from the coupling lens. The scanning optical system directs the light beam deflected by the deflector toward an image plane to form an image thereon. The frame supports the coupling lens, the deflector, and the scanning optical system. The frame includes a first recess and a second recess. The first recess opens toward one side of the frame in a first direction parallel to a rotation axis of the polygon mirror. The second recess opens toward the other side of the frame in a direction opposite to the first direction. The coupling lens and the deflector are located in the first recess, and the scanning optical system is located in the second recess.

BRIEF SUMMARY OF THE INVENTION

According to such a scanning optical device, since the coupling lens and the deflector are located in the same space unpartitioned, dust in the vicinity of the coupling lens may move toward and adhere to the polygon mirror.

It would be desirable to restrain dust in the vicinity of the coupling lens from moving toward and adhering to the polygon mirror.

Thus, in one aspect, a scanning optical device disclosed herein comprises a semiconductor laser, a coupling lens, a condenser lens, a deflector, a scanning optical system, a frame, and a first cover. The semiconductor laser emits light. The coupling lens converts the light emitted by the semiconductor laser to a light beam. The light beam received from the coupling lens is concentrated through the condenser lens in a sub scanning direction. The deflector includes a polygon mirror configured to deflect the light beam received from the condenser lens in a main scanning direction. The scanning optical system directs the light beam deflected by the deflector toward an image plane. The deflector and the scanning optical system are fixed to the frame. The first cover covers at least a portion of the frame on which the deflector is located.

The frame includes a first wall having a first opening through which a light beam traveling toward the polygon mirror passes. The condenser lens closes the first opening.

According to this configuration, since the condenser lens closes the first opening through which a light beam traveling from the coupling lens toward the polygon mirror passes, dust in the vicinity of the coupling lens can be restrained from moving toward and adhering to the polygon mirror.

The scanning optical device may further comprise a second cover arranged to cover at least a portion of the frame on which the coupling lens is located. The second cover may include a first rib that overlaps at least a part of the first wall as viewed in a direction in which a light beam entering the condenser lens travels.

According to this configuration, airtightness between the first wall and the cover can be improved.

The frame may be configured to comprise a diaphragm located between the coupling lens and the condenser lens, the diaphragm having an aperture stop through which the light beam passes. The condenser lens may be sandwiched between the first wall and the diaphragm.

According to this configuration, by sandwiching the condenser lens between the first wall and the diaphragm, the condenser lens can be placed in close contact with the first wall to improve airtightness.

The frame may include a second wall having a second opening through which the light beam reflected by the polygon mirror passes. The scanning optical system may comprise a plurality of scan lenses of which a scan lens closest to the polygon mirror closes the second opening.

According to this configuration, dust in the vicinity of the scanning optical system can be restrained from moving toward and adhering to the polygon mirror.

The scanning optical device may further comprise a seal member located between the scan lens and the first cover.

According to this configuration, airtightness between the scan lens and the cover can be improved.

The first cover may include a second rib that overlaps at least a part of the second wall as viewed in a direction in which a light beam entering the scan lens travels.

According to this configuration, airtightness between the cover and the second wall can be improved.

The scanning optical device may be configured such that the scanning optical system is located on one side of the polygon mirror at a distance from the polygon mirror in a second direction perpendicular to a first direction parallel to the rotation axis of the polygon mirror to receive a light beam deflected by the polygon mirror in the main scanning direction perpendicular to the first direction and to the second direction. The scanning optical device may further comprise a first screw and a second screw to fix the first cover to the frame. The rotation axis may be located between the first screw and the second screw in the main scanning direction.

According to this configuration, airtightness of a portion of the frame on which the deflector is positioned can be improved.

The scanning optical device may be configured to further comprise at least one other semiconductor laser and at least one other coupling lens, wherein two light beams let out through two coupling lenses are located apart from each other in the second direction, and the first screw is located between paths of the two light beams.

The first cover may cover the deflector and at least a part of the scanning optical system.

According to this configuration, the scanning optical system can be sealed together with the deflector by the cover that covers the deflector.

The frame may be configured to comprise a first base wall to which the deflector is attached, and a second base wall located on one side of the first base wall at a distance from the first base wall in a first direction parallel to a rotation axis of the polygon mirror. The deflector may be positioned on the one side of the first base wall. The coupling lens may be positioned on a side of the second base wall facing in a direction opposite to the first direction.

The scanning optical device may be configured to further comprise at least one other semiconductor laser and at least one other coupling lens, the semiconductor lasers comprising a first semiconductor laser configured to emit light, and a second semiconductor laser configured to emit light and located apart from the semiconductor laser in the sub scanning direction, the coupling lenses comprising a first coupling lens configured to convert the light emitted by the first semiconductor laser to a light beam, and a second coupling lens configured to convert the light emitted by the second semiconductor laser to a light beam, wherein the condenser lens concentrates the light beam from the first coupling lens and the light beam from the second coupling lens in the sub scanning direction.

According to this configuration, the first opening through which a plurality of light beams pass can be closed by a single condenser lens.

The scanning optical device may be configured to further comprise at least one other semiconductor laser and at least one other coupling lens, the semiconductor lasers comprising a first semiconductor laser configured to emit light, and a third semiconductor laser configured to emit light and located apart from the first semiconductor laser in a direction perpendicular to the sub scanning direction and to a direction in which a light beam entering the condenser lens travels, the coupling lenses comprising a first coupling lens configured to convert the light emitted by the first semiconductor laser to a light beam, and a third coupling lens configured to convert the light emitted by the third semiconductor laser to a light beam, wherein the condenser lens concentrates the light beam from the first coupling lens and the light beam from the third coupling lens in the sub scanning direction.

According to this configuration, the first opening through which a plurality of light beams pass can be closed by a single condenser lens.

The condenser lens may be configured to include a lens rib protruding in a direction in which a light beam entering the condenser lens travels, the lens rib being in contact with the first wall.

According to this configuration, the first opening can be closed airtightly by the condenser lens while the optical surfaces of the condenser lens are kept out of contact with the first wall.

Further, according to the above-described scanning optical device known in the art, a device for adjustment of a position of the coupling lens and a device for detection of a light beam received by the polygon mirror need to be located in the first recess, i.e., on the same side of the frame. Thus, constraints may be imposed on a structure of manufacturing equipment.

It would be desirable to reduce constraints imposed on a structure of equipment used, for example, for adjustment of the coupling lens.

Thus, in another aspect, a scanning optical device disclosed herein comprises a semiconductor laser, a coupling lens, a deflector, a scanning optical system, and a frame. The semiconductor laser emits light. The coupling lens converts the light emitted by the semiconductor laser to a light beam. The deflector includes a polygon mirror configured to deflect the light beam received from the coupling lens. The polygon mirror has a rotation axis parallel to a first direction. The scanning optical system directs the light beam deflected by the deflector toward an image plane. The deflector is fixed to the frame. The frame comprises a first base wall and a second base wall. The deflector is attached to the first base wall. The second base wall is located on one side of the first base wall at a distance from the first base wall in the first direction. The deflector is located on the one side of the first base wall. The coupling lens is located on one side of the second base wall facing in a direction opposite to the first direction.

According to this configuration, since the device for positional adjustment of the coupling lens can be positioned on the other side of the frame facing in a direction opposite to the first direction, and the device for detection of a light beam received by the polygon mirror can be positioned on the one side of the frame facing in the first direction, the constraints imposed on a structure of manufacturing equipment can be reduced.

At least a part of the scanning optical system may be attached to the first base wall on the one side of the first base wall.

According to this configuration, the deflector and the scanning optical system are attached from the same direction; thus, the scanning optical system can be positioned accurately.

The light beam from the scanning optical system may be directed in the first direction toward an image plane.

According to this configuration, the light beam let out from the scanning optical system can be measured from a side of the frame opposite to a side on which the device for positional adjustment of the coupling lens is located.

The scanning optical system may be configured to comprise a reflecting mirror arranged to reflect a light beam toward an image plane, the reflecting mirror being exposed to an outside of the frame and accessible from a side of the first base wall facing in the direction opposite to the first direction.

According to this configuration, since the reflecting mirror is exposed to an outside of the frame and accessible from a side of the first base wall facing in the direction opposite to the first direction, the coupling lens and the reflecting mirror which need to be adjusted can be adjusted from the same side.

The scanning optical device may further comprise a first cover arranged to cover sides of the deflector and the first base wall facing in the first direction.

According to this configuration, dust can be restrained by the first cover from adhering to the deflector.

The scanning optical device may further comprise a second cover arranged to cover the side of the coupling lens and the second base wall facing in the direction opposite to the first direction.

According to this configuration, dust can be restrained by the first cover from adhering to the coupling lens.

The scanning optical system may be located on one side of the polygon mirror at a distance from the polygon mirror in a second direction perpendicular to the first direction. A light beam deflected by the polygon mirror in a main scanning direction perpendicular to the first direction and to the second direction enters the scanning optical system. The scanning optical device may further comprise a first screw and a second screw to fix the first cover to the frame. The rotation axis may be located between the first screw and the second screw in the main scanning direction.

According to this configuration, airtightness by the first cover may be improved.

The scanning device may be configured to further comprise at least one other semiconductor laser and at least one other coupling lens, two light beams let out through two coupling lenses being located apart in the second direction, the first screw being located between the paths of the two light beams.

BRIEF DESCRIPTION OF THE SEVERAL VIEWS OF THE DRAWINGS

The above and other aspects, their advantages and further features will become more apparent by describing in detail illustrative, non-limiting embodiments thereof with reference to the accompanying drawings briefly described below:

FIG. 15 is a partial cross-sectional view of the scanning optical device, showing the relation between the first wall and the first rib of the second cover.

DETAILED DESCRIPTION OF THE INVENTION

Figure 1:
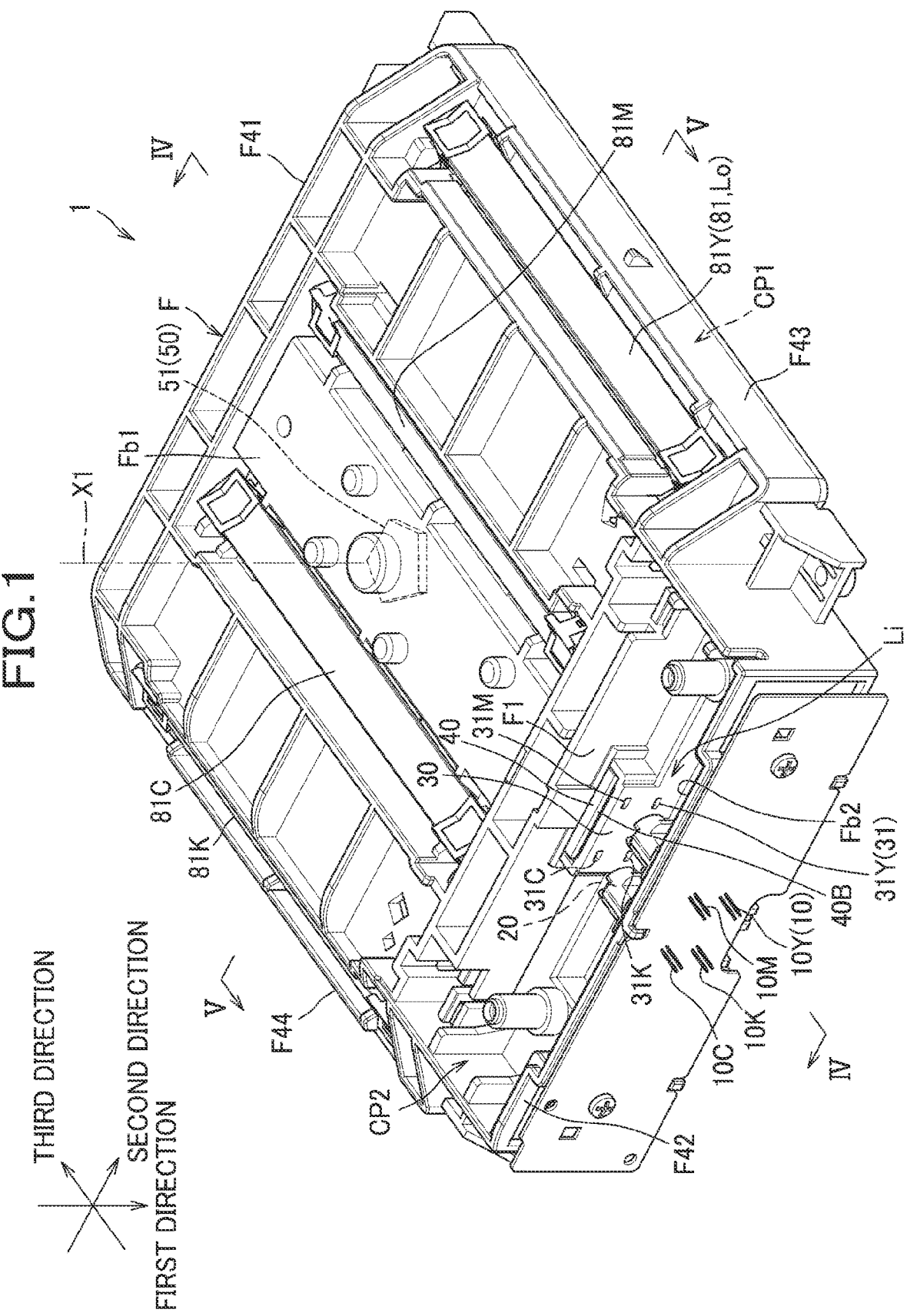
FIG. 1 is a perspective view of a scanning optical device, showing one side thereof facing in a direction opposite to a first direction.
Figure 2:
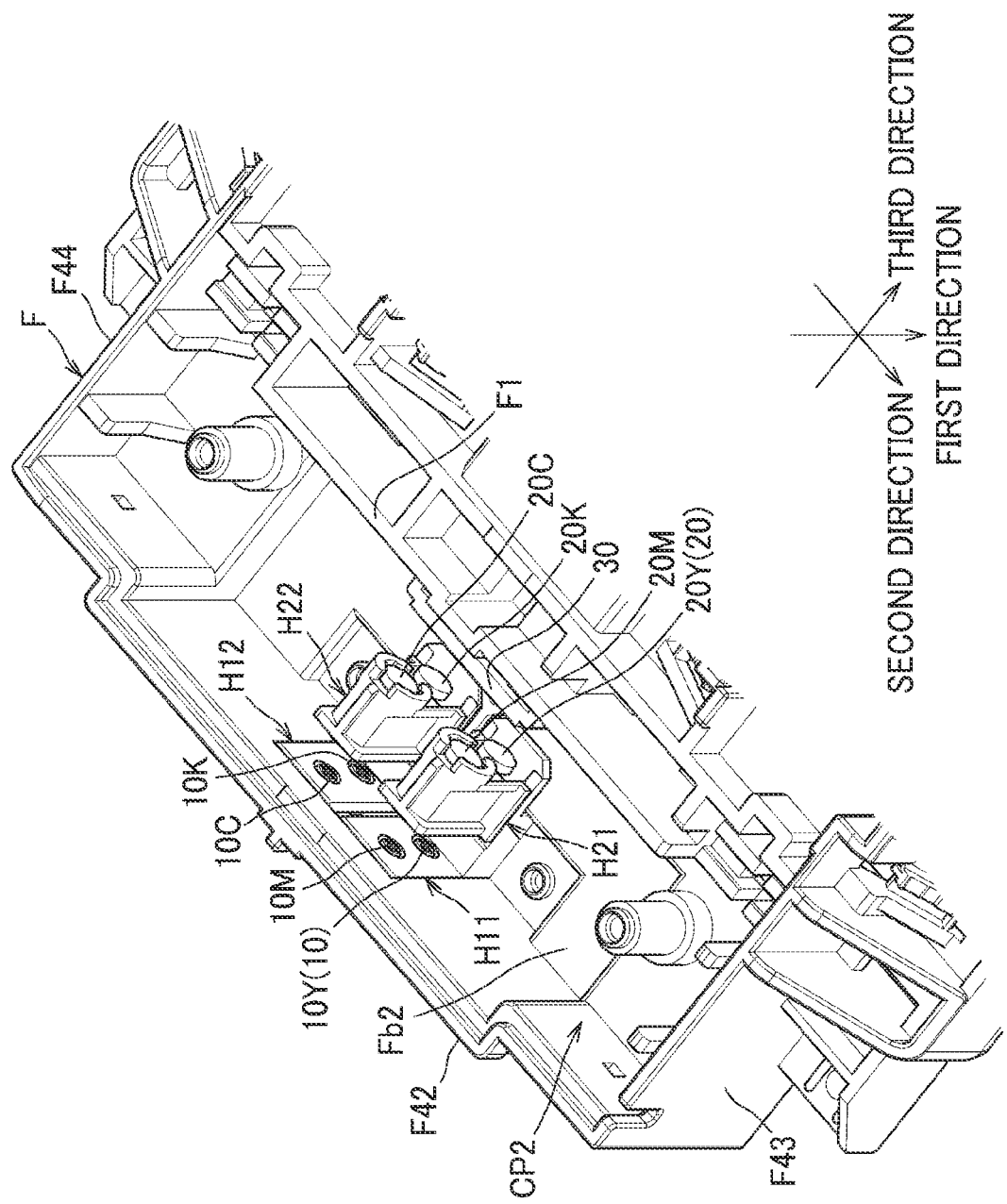
FIG. 2 is a perspective view showing structures at and around coupling lenses.
Figure 3:
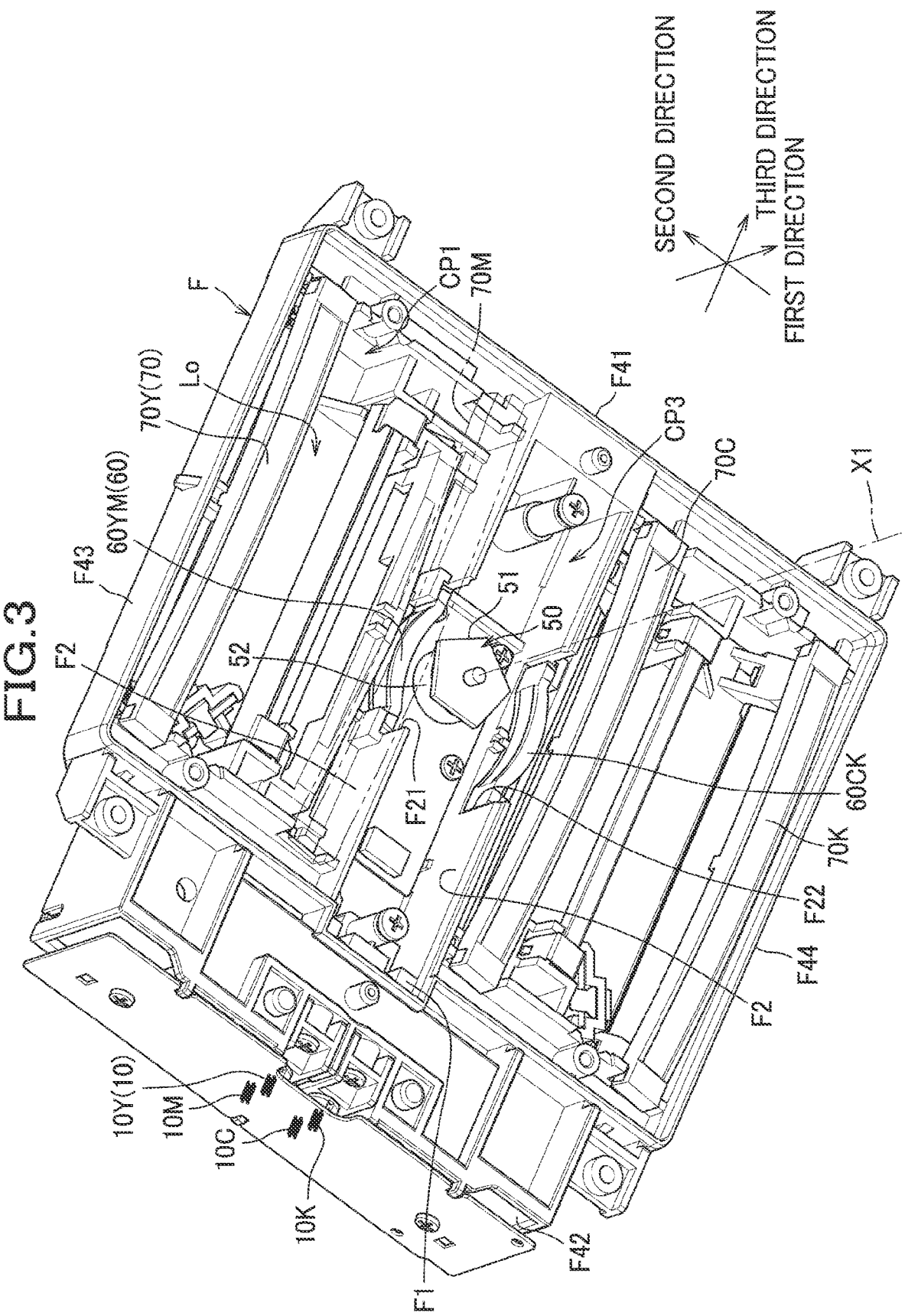
FIG. 3 is a perspective view of the scanning optical device, showing the other side thereof facing in the first direction.

As shown in FIGS. 1 to 3, a scanning optical device 1 comprises a frame F, an illumination optical system Li, a deflector 50, and a scanning optical system Lo. The scanning optical device 1 is applied to an electrophotographic image forming apparatus. In the following description, a direction parallel to a rotation axis X1 of a polygon mirror 51 shown in FIG. 3 will be referred to as "first direction". A direction in which the polygon mirror 51 and first scan lenses 60 are arranged as shown in FIG. 3, perpendicular to the first direction, will be referred to as "second direction". Further, a direction perpendicular to the first direction and to the second direction will be referred to as "third direction". In the scanning optical system Lo, the third direction corresponds to a main scanning direction. Each of the arrows in the drawings points in a corresponding direction.

As shown in FIG. 2, the illumination optical system Li comprises four semiconductor lasers 10, four coupling lenses 20, a diaphragm 30, and a condenser lens 40 (see FIG. 1).

The semiconductor laser 10 is a device which emits light. One semiconductor laser 10 is provided for each of four photosensitive drums 200 (see FIG. 5) to be scanned with and exposed to light by the scanning optical device 1. A toner image of a different color is formed on a surface of each photosensitive drum 200.

In this example, the first color is "yellow (Y)", the second color is "magenta (M)", the third color is "cyan (C)", and the fourth color is black (K). In the following description, "first" may be added to the beginning of a name of a part and "Y" may be added to the end of a reference character of the part to designate the part corresponding to the first color. Similarly, "second", "third", or "fourth" may be added to the beginning of a name of a corresponding part and "M", "C", or "K" may be added to the end of a corresponding reference character, to designate parts respectively corresponding to the second color, the third color and the fourth color.

The first semiconductor laser 10Y is aligned with and spaced apart from the second semiconductor laser 10M in the first direction. The first semiconductor laser 10Y is located at a distance from the second semiconductor laser 10M in the first direction.

The third semiconductor laser 10C is aligned with and spaced apart from the second semiconductor laser 10M in a direction opposite to the second direction. The third semiconductor laser 10C is located at a distance from the second semiconductor laser 10M in the direction opposite to the second direction. The fourth semiconductor laser 10K is aligned with and spaced apart from the third semiconductor laser 10C in the first direction, and aligned with and spaced apart from the first semiconductor laser 10Y in the direction opposite to the second direction.

The coupling lenses 20 are lenses for converting light received from the semiconductor lasers 10 to light beams. Each of the coupling lenses 20Y, 20M, 20C, 20K corresponds to a different color and faces a corresponding semiconductor laser 10Y, 10M, 10C, 10K.

As shown in FIG. 1, the diaphragm 30 is formed integrally with the frame F and has aperture stops 31 through which light beams from the coupling lenses 20 pass. The diaphragm 30 is located between the coupling lenses 20 and the condenser lens 40.

The condenser lens 40 is a lens through which a light beam from each of the coupling lenses 20 is concentrated on the polygon mirror 51 in the sub scanning direction. The condenser lens 40 and the coupling lenses 20 are located on opposite sides of the diaphragm 30.

As shown in FIG. 3, the deflector 50 comprises a polygon mirror 51 and a motor 52. The polygon mirror 51 is a mirror that deflects a light beam from the condenser lens 40 in the main scanning direction. The polygon mirror 51 has five mirror surfaces disposed equidistantly from the rotation axis X1. The motor 52 rotates the polygon mirror 51. The motor 52 is fixed to the frame F.

Figure 5:
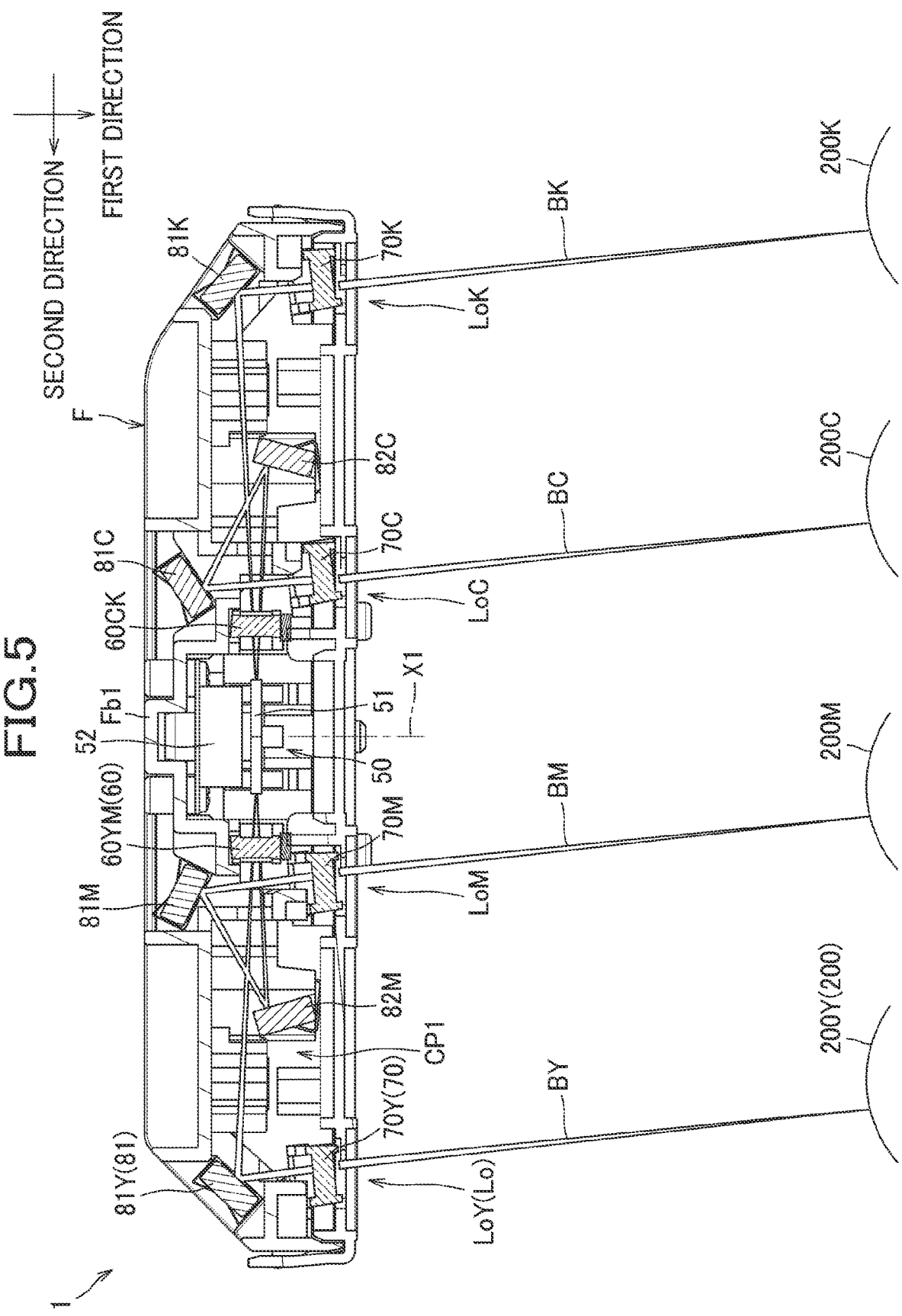
FIG. 5 is a cross-sectional view taken along a line V-V of FIG. 1.

The scanning optical system Lo is an optical system that directs a light beam deflected by the deflector 50 toward a surface (i.e., image plane) of the photosensitive drum 200 to form an image thereon. The scanning optical system Lo is fixed to the frame F. As shown in FIG. 5, the scanning optical system Lo comprises a first scanning optical system LoY corresponding to yellow, a second scanning optical system LoM corresponding to magenta, a third scanning optical system LoC corresponding to cyan, and a fourth scanning optical system LoK corresponding to black.

The first scanning optical system LoY and the second scanning optical system LoM are located on one side of the polygon mirror 51 at distances from the polygon mirror 51 in the second direction. The third scanning optical system LoC and the fourth scanning optical system LoK are located on the other side of the polygon mirror 51 at distances from the polygon mirror 51 in the direction opposite to the second direction. Light beams deflected in the main scanning direction by the polygon mirror 51 enter the respective scanning optical systems LoY, LoM, LoC, LoK.

The first scanning optical system LoY comprises a first scan lens 60YM, a second scan lens 70Y, and a reflecting mirror 81Y.

The first scan lens 60YM is a lens that causes the light beams BY, BM deflected by the deflector 50 to be refracted and focused in the main scanning direction to form images on the image planes. The first scan lens 60YM has a f-theta characteristic such that the light beam deflected at a constant angular velocity by the deflector 50 is converted into a light beam that scans the image surface at a constant linear velocity. The first scan lens 60YM is the scan lens of the first scanning optical system LoY closest to the polygon mirror 51.

The reflecting mirror 81Y is a mirror that reflects the light beam BY received from the first scan lens 60YM toward the image plane.

The second scan lens 70Y is a lens that causes the light beam BY reflected by the reflecting mirror 81Y to be refracted and focused in the sub scanning direction to form an image on the image plane. The second scan lens 70Y is located on one side of the polygon mirror 51 at a distance from the polygon mirror 51 in the first direction. The second scan lens 70Y is the scan lens of the first scanning optical system LoY closest to the image plane.

The second scanning optical system LoM comprises the first scan lens 60YM, a second scan lens 70M, a reflecting mirror 81M, and a mirror 82M.

The first scan lens 60YM is shared with the first scanning optical system LoY. The second scan lens 70M and the reflecting mirror 81M respectively have similar functions as those of the second scan lens 70Y and the reflecting mirror 81Y of the first scanning optical system LoY. The mirror 82M reflects the light beam BM received from the first scan lens 60YM toward the reflecting mirror 81M.

The third scanning optical system LoC has a structure approximately axisymmetrical to the second scanning optical system LoM with respect to the rotation axis X1 of the polygon mirror 51. Specifically, the third scanning optical system LoC comprises a first scan lens 60CK, a second scan lens 70C, a reflecting mirror 81C, and a mirror 82C each having a similar function as that of a corresponding member of the second scanning optical system LoM.

The fourth scanning optical system LoK has a structure approximately axisymmetrical to the first scanning optical system LoY with respect to the rotation axis X1 of the polygon mirror 51. Specifically, the fourth scanning optical system LoK comprises a first scan lens 60CK, a second scan lens 70K, and a reflecting mirror 81K each having a similar function as that of a corresponding member of the first scanning optical system LoY.

Figure 4:
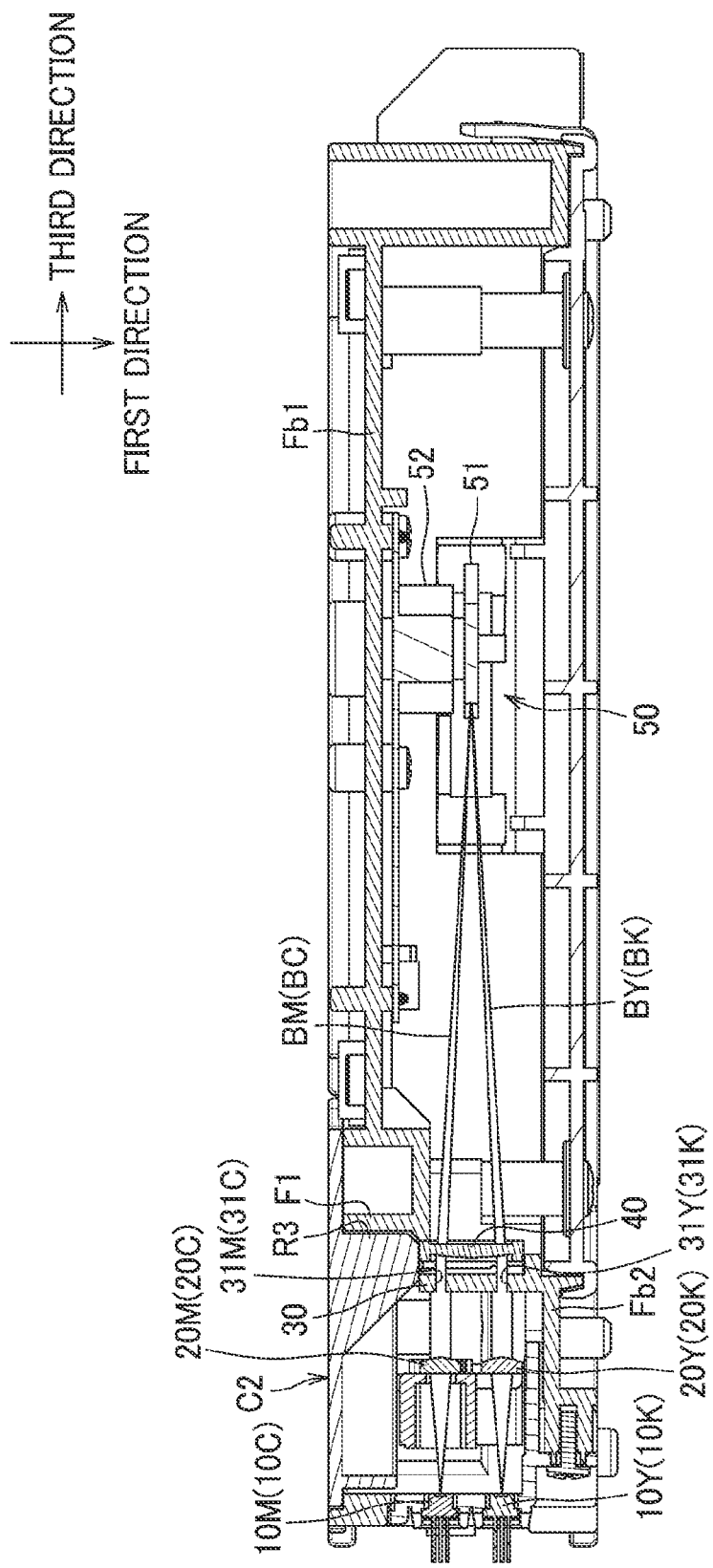
FIG. 4 is a cross-sectional view taken along a line IV-IV of FIG. 1.

As shown in FIG. 4, light emitted from each of the semiconductor lasers 10Y, 10M, 10C, 10K is converted to a light beam BY, BM, BC, BK when passing through a corresponding coupling lens 20Y, 20M, 20C, 20K. The beams BY, BM, BC, BK pass through respective aperture stops 31Y, 31M, 31C, 31K of the diaphragm 30, and then through the condenser lens 40, and strike a reflecting surface of the polygon mirror 51. The condenser lens 40 is a lens through which all of the light beams BY, BM, BC, BK pass. The condenser lens 40 has a cylindrical incident-side surface and a flat exit-side surface.

As shown in FIG. 5, the polygon mirror 51 deflects the light beams BY, BM, BC, BK toward the respective scanning optical systems LoY, LoM, LoC, LoK. The light beam BY deflected toward the first scanning optical system LoY passes through the first scan lens 60YM and is reflected by the reflecting mirror 81Y. The light beam BY then passes through the second scan lens 70Y and is directed to the image plane. The light beam BY is let out through the second scan lens 70Y at a predetermined angle with respect to the first direction toward the first image plane. The light beam BY is focused on a surface of the first photosensitive drum 200Y and scans the surface of the first photosensitive drum 200Y in the main scanning direction.

The light beam BM deflected toward the second scanning optical system LoM passes through the first scan lens 60YM and is reflected by the mirror 82M and the reflecting mirror 81M. The light beam BM then passes through the second scan lens 70M and is directed to the image plane. The light beam BM is let out through the second scan lens 70M at a predetermined angle with respect to the first direction toward the first image plane. The light beam BM is focused on a surface of the second photosensitive drum 200M and scans the surface of the second photosensitive drum 200M in the main scanning direction. Similarly, each of the light beams BC, BK is directed by a corresponding scanning optical system LoC, LoK toward a corresponding image plane, and is focused on a surface of a corresponding photosensitive drum 200C, 200K and scans the surface of the corresponding photosensitive drum 200C, 200K in the main scanning direction.

The frame F is made of plastic and is molded in one piece. The frame F includes a first recess CP1 shown in FIG. 7 and a second recess CP2 shown in FIG. 6. The first recess CP1 opens in the first direction. The second recess CP2 opens in a direction opposite to the first direction. As shown in FIG. 5, the deflector 50 and a part of the scanning optical system Lo is located in the first recess CP1. Specifically, members of the scanning optical system Lo excluding the reflecting mirrors 81 are located in the first recess CP1. As shown in FIG. 2, the coupling lenses 20, the diaphragm 30, and the condenser lens 40 (see FIG. 1) are located in the second recess CP2.

Figure 6:
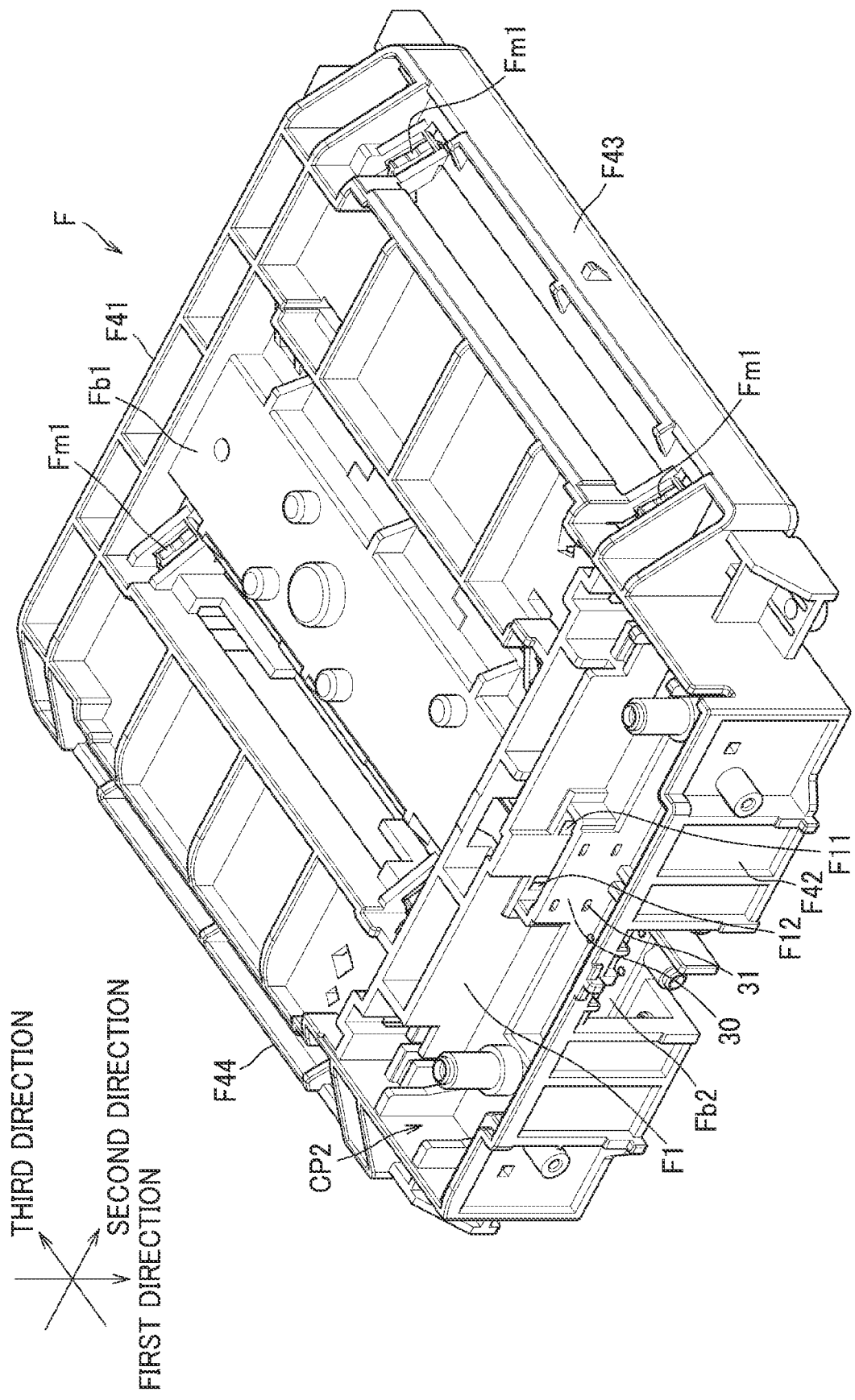
FIG. 6 is a perspective view of a frame, showing one side thereof facing in the direction opposite to the first direction.
Figure 7:
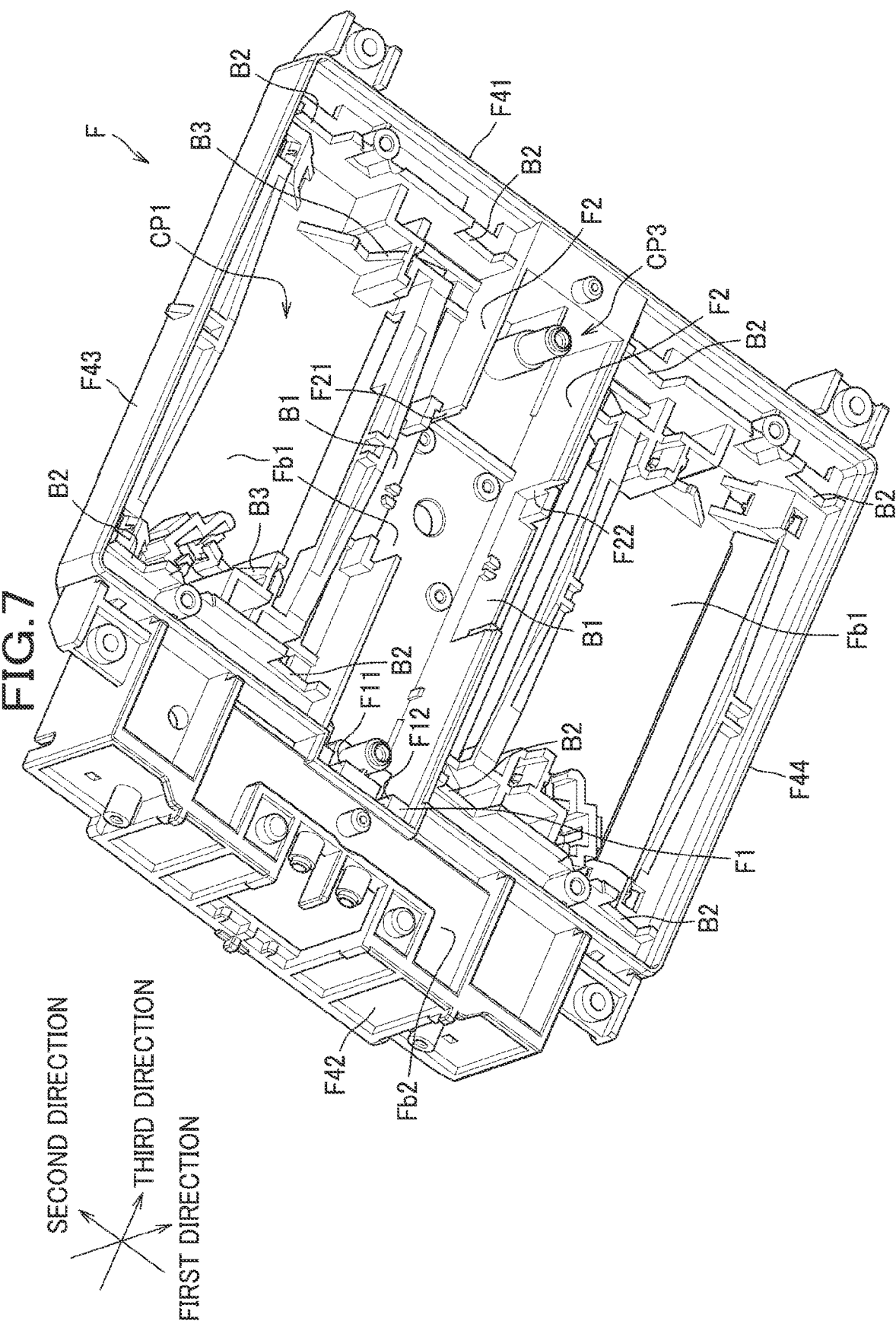
FIG. 7 is a perspective view of the frame, showing the other side thereof facing in the first direction.

As shown in FIGS. 6 and 7, the frame F includes a first base wall Fb1 located at the bottom of the first recess CP1, and a second base wall Fb2 located at the bottom of the second recess CP2.

The first base wall Fb1 and the second base wall Fb2 are walls that are oriented at an angle with respect to the first direction. Specifically, the first base wall Fb1 and the second base wall Fb2 are walls of which thicknesses are dimensions as measured in the first direction. That is, the first base wall Fb1 and the second base wall Fb2 are walls with surfaces perpendicular to the first direction.

The second base wall Fb2 is located on one side of the first base wall Fb1 at a distance from the first base wall Fb1 in the first direction. As shown in FIG. 5, the deflector 50 is attached to the first base wall Fb1. Specifically, a substrate of the motor 52 is fixed to the first base wall Fb1 from a side of the first base wall Fb1 facing in the first direction by screws. Further, the part of the scanning optical system Lo described above is fixed to the one side of the first base wall Fb1. Specifically, as shown in FIG. 7, the first scan lenses 60YM, 60CK are attached to a first seating surface B1 forming a part of the first base wall Fb1. The first seating surface B1 is a surface located apart, in the first direction, from a portion of the first base wall Fb1 to which the deflector 50 is attached. The second scan lenses 70Y, 70M, 70C, 70K are attached to a second seating surface B2 protruding from the first base wall Fb1 in the first direction. The mirrors 82M, 82C are attached to a third seating surface B3 protruding from the first base wall Fb1 in the first direction. The portion of the first base wall Fb1 overlapping the mirrors 82M, 82C as viewed in the first direction is a surface located apart, in the first direction, from the portion of the first base wall Fb1 to which the deflector 50 is attached. Thus, the deflector 50 and the part of the scanning optical system Lo are located on one side of the first base wall Fb1 facing in the first direction. As shown in FIG. 2, the semiconductor lasers 10, the coupling lenses 20, and the diaphragm 30 are located on one side of the second base wall Fb2 facing in the direction opposite to the first direction. Further, as shown in FIG. 1, the condenser lens 40 and the reflecting mirrors 81 are also located on the one side of the second base wall Fb2 facing in the direction opposite to the first direction.

The reflecting mirrors 81 are located in the vicinity of the first base wall Fb1 and exposed to the outside of the frame F to be accessible from a side of the first base wall Fb1 facing in the direction opposite to the first direction. In other words, the first base wall Fb1 is not located over the reflecting mirrors 81 exposed to the outside of the frame F. Thus, the reflecting mirrors 81 are exposed to the outside of the frame F without being covered by the first base wall Fb1, and can be attached to the frame F from a side of the frame F facing in the direction opposite to the first direction.

As shown in FIG. 6, the frame F further includes a first wall F1 located between the first recess CP1 and the second recess CP2. The first wall F1 is connected to the first base wall Fb1 and to the second base wall Fb2 (see also FIG. 7). The first wall F1 protrudes from the second base wall Fb2 in the direction opposite to the first direction and protrudes from the first base wall Fb1 in the first direction.

The first wall F1 includes two first openings F11, F12 through which light beams BY, BM, BC, BK traveling from the aperture stops 31 of the diaphragm 30 toward the polygon mirror 51 pass. The first openings F11, F12 are formed as slits elongate in the first direction. The first openings F11, F12 penetrate the first wall F1 in the third direction and have ends opening in the first direction (see FIG. 7). The first opening F11 allows light beams BY, BM to pass therethrough. The first opening F12 allows light beams BC, BK to pass therethrough.

As shown in FIG. 1, the condenser lens 40 is disposed to close the first holes F11, F12 shown in FIG. 6. The condenser lens 40 is sandwiched between the first wall F1 and the diaphragm 30. As shown in FIG. 15, the condenser lens 40 includes lens ribs 40A and lens ribs 40B. The lens ribs 40A protrude in the third direction relative to the exit-side surface of the condenser lens 40 and are in contact with the first wall F1. The lens ribs 40B protrude in a direction opposite to the third direction relative to the incident-side surface of the condenser lens 40 and are in contact with the diaphragm 30. Specifically, the ends of the lens ribs 40B in the second direction contact the diaphragm 30 (see FIG. 1). The lens ribs 40A, 40B are configured to respectively surround the incident-side surface and the exit-side surface of the condenser lens 40, i.e., the optical surfaces of the condenser lens 40. Accordingly, the first openings F11, F12 can be closed airtightly by the condenser lens 40 while the optical surfaces of the condenser lens 40 is kept out of direct contact with the first wall F1 or the diaphragm 30.

As shown in FIGS. 3 and 7, the frame F further includes two second walls F2 disposed on both sides of the polygon mirror 51 at distances from the polygon mirror 51 in the second direction and in the direction opposite to the second direction (see FIG. 3). The second wall F2 disposed at a distance from polygon mirror 51 in the second direction has a second opening F21 that allows light beams BY, BM reflected by the polygon mirror 51 to pass therethrough. The other second wall F2 disposed at a distance from polygon mirror 51 in the direction opposite to the second direction has a second opening F22 that allows light beams BC, BK reflected by the polygon mirror 51 to pass therethrough. Each of the second openings F21, F22 penetrates a corresponding second wall F2 in the second direction and has an end that opens in the first direction.

Each of the second walls F2 protrudes from the first base wall Fb1 in the first direction. Each of the second walls F2 is connected to the first wall F1 and a first side wall F41 which will be described later. In this way, a third recess CP3 for accommodating the polygon mirror 51 is formed by the first base wall Fb1, the first wall F1, the second walls F2, and the first side wall F41.

The first scan lens 60YM is disposed to close part of the second opening F21. The first scan lens 60CK is disposed to close part of the second opening F22.

The frame F further includes a first side wall F41, a second side wall F42, a third side wall F43, and a fourth side wall F44 which form an approximately rectangular structure that surrounds the recesses CP1, CP2.

The first side wall F41 is located on a side of the deflector 50 opposite to the other side of the deflector 50 on which the semiconductor lasers 10 are located. The first side wall F41 protrudes from the first base wall Fb1 in the first direction.

The second side wall F42 is located on a side of the deflector 50 opposite to the other side of the deflector 50 on which the first side wall F41 is located. Specifically, the second side wall F42 is located on a side of the coupling lenses 20 opposite to the other side of the coupling lenses 20 on which the deflector 50 is located. The second side wall F42 protrudes from the second base wall Fb2 in the direction opposite to the first direction.

The third side wall F43 is located on a side of the first scan lens 60YM opposite to the other side of the first scan lens 60YM on which the deflector 50 is located. The third side wall F43 is connected to the first side wall F41, the first base wall Fb1, the second base wall Fb2, and the second side wall F42 at respective ends of the walls F41, Fb1, Fb2, F42 facing in the second direction. A portion of the third side wall F43 protrudes from the first base wall Fb1 in the first direction, and another portion of the third side wall F43 protrudes from the second base wall Fb2 in the direction opposite to the first direction.

The fourth side wall F44 is located on a side of the first scan lens 60CK opposite to the other side first scan lens 60CK on which the deflector 50 is located. The fourth side wall F44 is connected to the first side wall F41, the first base wall Fb1, the second base wall Fb2, and the second side wall F42 at the respective ends of the walls F41, Fb1, Fb2, F42 facing in the direction opposite to the second direction. A portion of the fourth side wall F44 protrudes from the first base wall Fb1 in the first direction, and another portion of the fourth side wall F44 protrudes from the second base wall Fb2 in the direction opposite to the first direction.

Figure 8:
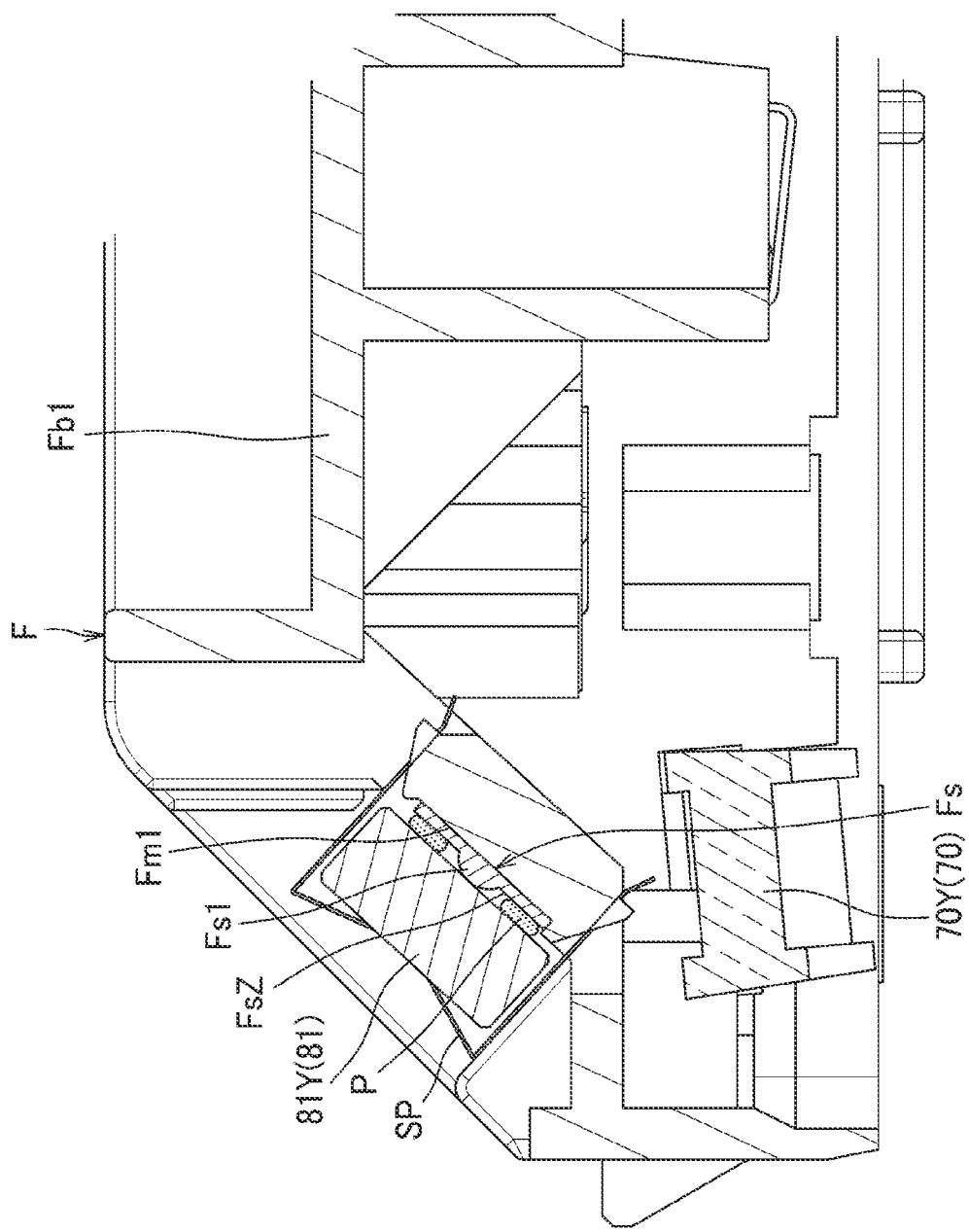
FIG. 8 is a cross-sectional view of a structure for attaching a reflecting mirror to the frame.

As shown in FIG. 8, the scanning optical device 1 further comprises a support member Fs installable into and removable from the frame F including the first recess CP1, the second recess CP2 and the other portions. The support member Fs is a member for supporting the reflecting mirror 81. The support member Fs includes a seating surface FsZ on which the reflecting mirror 81 is supported. The seating surface FsZ allows adjustment of an angle of the reflecting mirror 81. The seating surface FsZ includes a spherical protrusion Fs1 capable of supporting the reflecting mirror 81 in a manner that allows the reflecting mirror 81 to be tilted.

The protrusion Fs1 protrudes toward the reflecting mirror 81, and is in contact with the reflecting mirror 81. The protrusion Fs1 serves as a supporting point on which the reflecting mirror 81 is tiltably supported during adjustment of an orientation or angle of the reflecting mirror 81. The orientation of the reflecting mirror 81 with respect to the seating surface FsZ is fixed by a photo-curable resin P. The photo-curable resin P may be, for example, a ultraviolet-curable resin. The reflecting mirror 81 and the support member Fs fixed to each other by the photo-curable resin P are attached to the frame F by a U-shaped leaf spring SP.

The support member Fs and the leaf spring SP are provided at both ends of each reflecting mirror 81. The pair of support members Fs and the pair of leaf springs SP are provided for each of the four reflecting mirrors 81.

The frame F has a supporting surface Fm1 for supporting the support member Fs. The supporting surface Fm1 is located in positions corresponding to the ends of each of the four reflecting mirrors 81 (see FIG. 6).

When each of the reflecting mirrors 81 is attached to the frame F, the photo-curable resin P is applied to both sides of the protrusion Fs1 of a corresponding support member Fs, and then the support member Fs is attached to the supporting surface Fm1. Subsequently, the reflecting mirror 81 is positioned in contact with the protrusion Fs1 of the corresponding support member Fs. At this point in time, the photo-curable resin P is in contact with both of the support member Fs and the reflecting mirror 81. Next, the leaf spring SP is attached to the frame F, whereby and the reflecting mirror 81 is pressed together with the support member Fs against the frame F. The angle of the reflecting mirror 81 is adjusted by tilting the reflecting mirror 81 supported on the protrusion Fs1 as light is being emitted from the semiconductor laser 10 while observing the position of the light beam on the image plane. Adjustment of the angle of the reflecting mirror 81 is performed by pressing an arm AM (not shown) on the reflecting mirror 81 to move the reflecting mirror 81. After adjustment of the angle is finished, the reflecting mirror 81 is fixed to the support member Fs by applying light on the photo-curable resin P.

As shown in FIG. 2, the scanning optical device 1 further comprises a first laser holder H11, a second laser holder H12, a first lens holder H21, and a second lens holder H22.

The first laser holder H11 is a member that holds the first semiconductor laser 10Y, the second semiconductor laser 10M, and the first coupling lens 20Y. The first laser holder H11 has a cross section in the shape of the letter L. The first coupling lens 20Y is fixed to the first laser holder H11 by a photo-curable resin. The first coupling lens 20Y can be attached to the first laser holder H11 in the first direction. The first laser holder H11 is fixed to the frame F. Since the second laser holder H12 has a configuration similar to that of the first laser holder H11 and is only different from the first laser holder H11 regarding the object it holds, explanation thereof will be omitted.

The first lens holder H21 is a member that holds the second coupling lens 20M in a position aligned with the first coupling lens 20Y in the first direction. The first lens holder H21 includes a hollow cylindrical portion in which the second coupling lens 20M is fitted. The first lens holder H21 is fixed to the first laser holder H11 by a photo-curable resin. The first lens holder H21 can be attached to the first laser holder H11 in the first direction. Since the second lens holder H22 has a configuration similar to that of the first lens holder H21 and is only different from the first laser holder H21 regarding the object it holds and the component to which it is fixed, i.e., the second laser holder H12, explanation thereof will be omitted.

When attaching the coupling lenses 20 to the frame, first of all, each of the laser holders H11, H12 is fixed to the frame F. Then, the photo-curable resin is applied to either the first coupling lens 20Y or the first laser holder H11, and the position of the first coupling lens 20Y is adjusted with respect to the first semiconductor laser 10Y. After adjustment, the first coupling lens 20Y is fixed to the first laser holder H11 by applying light to the photo-curable resin. The fourth coupling lens 20K is fixed to the second laser holder H12 in the same way as the first coupling lens 20Y is fixed to the first laser holder H11.

Subsequently, the photo-curable resin is applied to the first lens holder H21 holding the second coupling lens 20M or the first laser holder H11, and the position of the second coupling lens 20M is adjusted with respect to the second semiconductor laser 10M. After adjustment, the first lens holder H21 is fixed to the first laser holder H11 by applying light to the photo-curable resin. The third coupling lens 20C is fixed via the second lens holder H22 to the second laser holder H12 in the same way as the second coupling lens 20M is fixed to the first lens holder H11.

Figure 9:
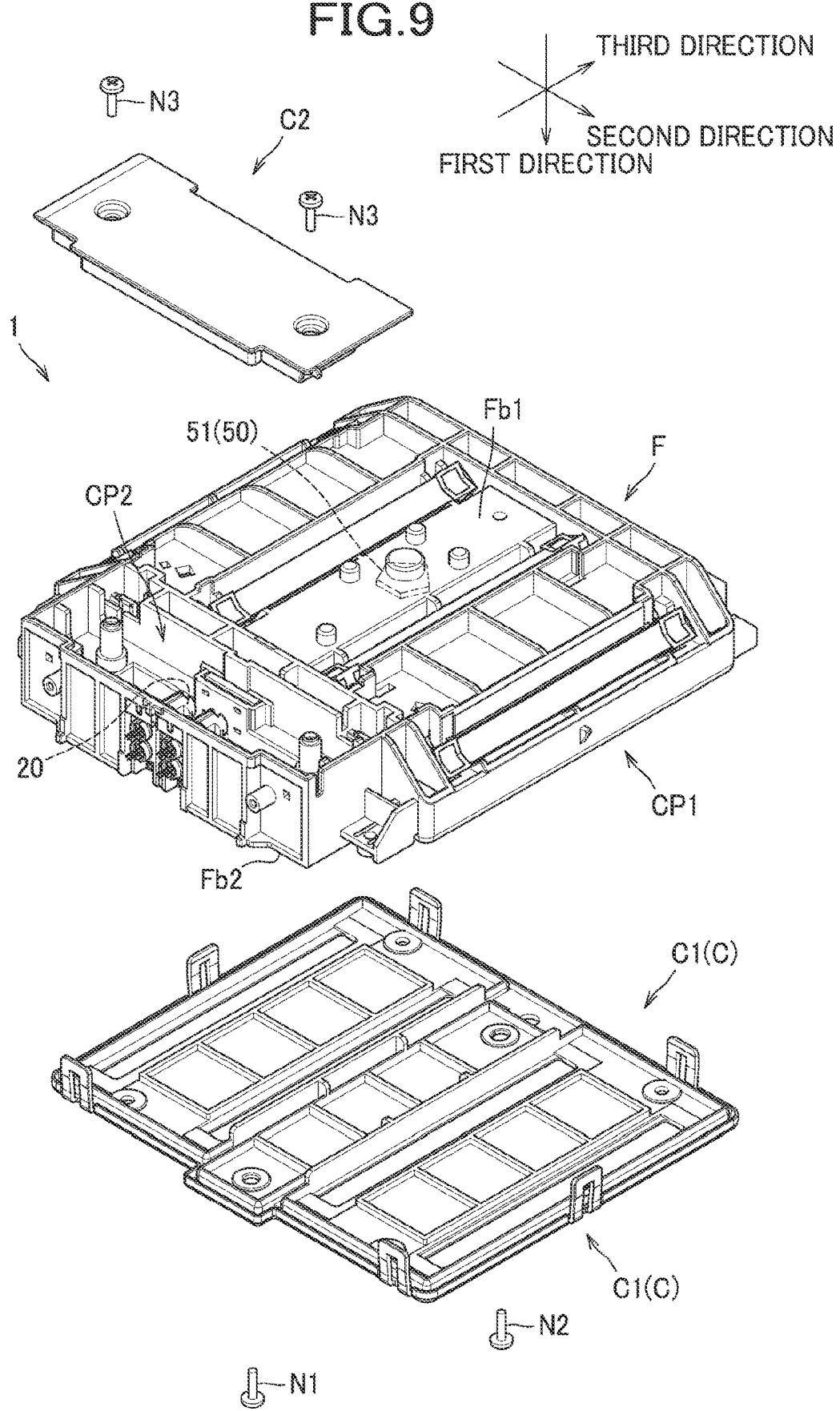
FIG. 9 is an exploded perspective view showing the frame, a first cover, and a second cover.

As shown in FIG. 9, the scanning optical device 1 further comprises a cover C. The cover C comprises a first cover C1 and a second cover C2.

The first cover C1 covers sides of the deflector 50 and the first base wall Fb1 facing in the first direction. Specifically, the first cover C1 covers the first recess CP1.

The second cover C2 covers sides of the coupling lens 20 and the second base wall Fb2 facing in the direction opposite to the first direction. Specifically, the second cover C2 covers the second recess CP2.

The scanning optical device 1 further comprises a first screw N1, a second screw N2, and two third screws N3. The first screw N1 and the second screw N2 are used to fix the first cover C1 to the frame F. The third screws N3 are used to fix the second cover C2 to the frame F.

Figure 10:
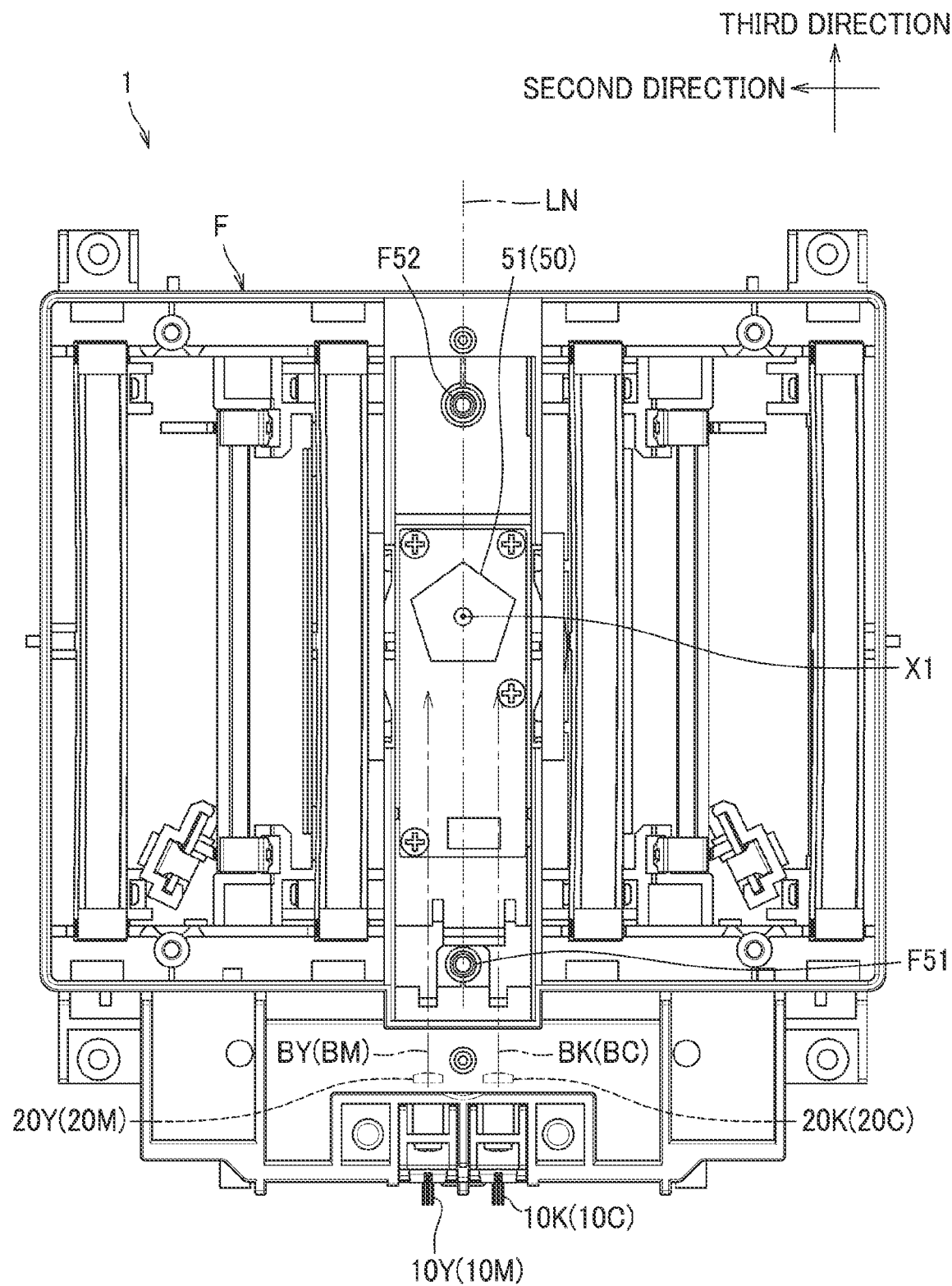
FIG. 10 is a plan view of the scanning optical device as viewed from the first direction.

As shown in FIG. 10, the frame F includes a first boss F51 in which the first screw N1 is screwed, and a second boss F52 in which the second screw N2 is screwed. The first boss F51, the rotation axis X1 of the polygon mirror 51, and the second boss F52 are aligned in the third direction. Specifically, the first boss F51 and the second boss F52 are located along a straight line LN extending in the third direction through the rotation axis X1. The rotation axis X1 is located between the first boss F51 and the second boss F52 in the third direction. The first boss F51 is located between the paths of two light beams located apart from each other in the second direction, for example, between the paths of the light beams BY, BK.

Figure 11:
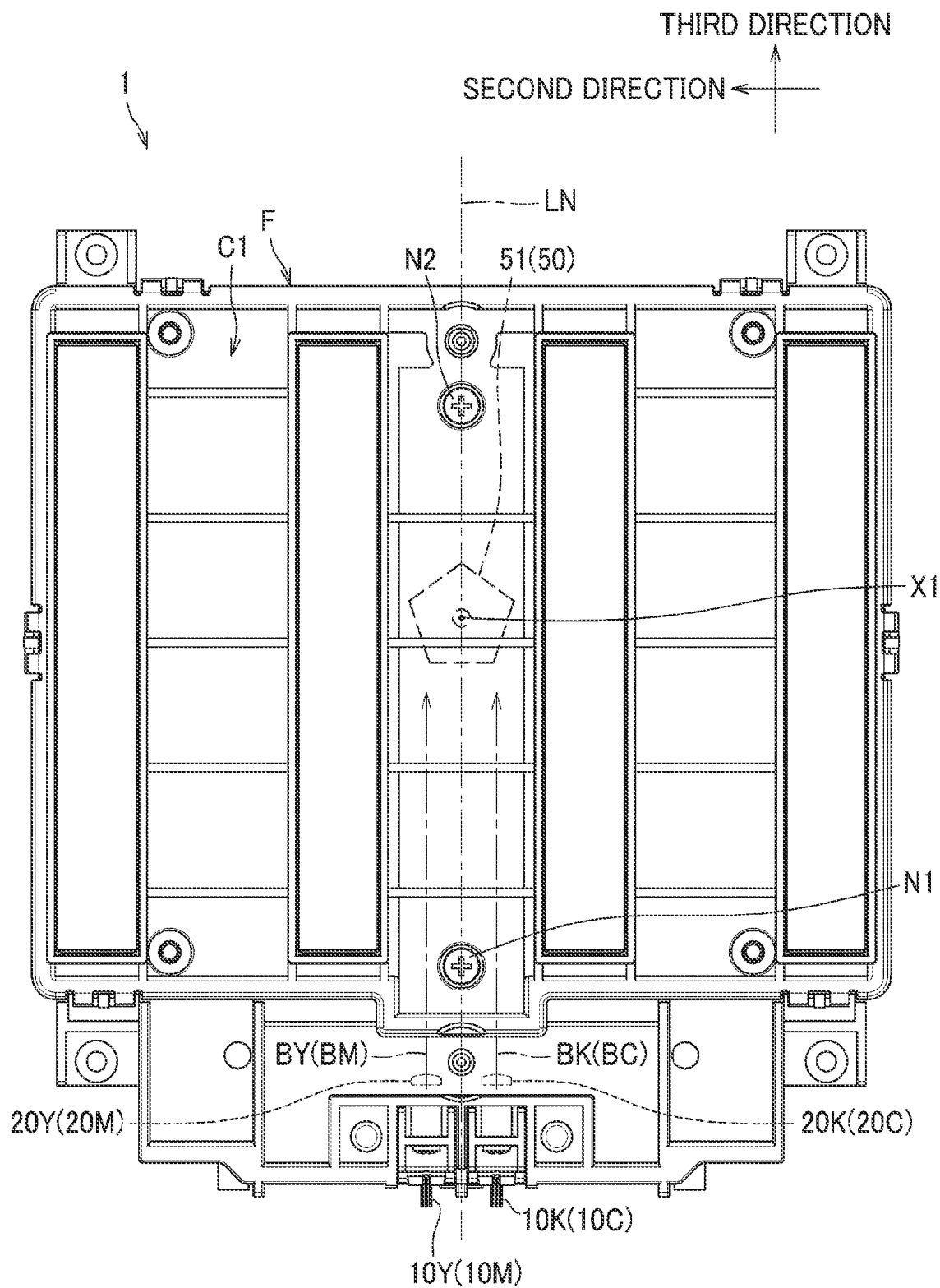
FIG. 11 is a plan view of the scanning optical device to which the first cover is attached, as viewed from the first direction.

Thus, as shown in FIG. 11, when the first cover C1 is attached to the frame F, the rotation axis X1 is located between the first screw N1 and the second screw N2 in the third direction. The first screw N1 and the second screw N2 are located on the straight line LN described above. Further, the first screw N1 is located between the paths of the two light beams BY, BK located apart in the second direction.

Figure 12:
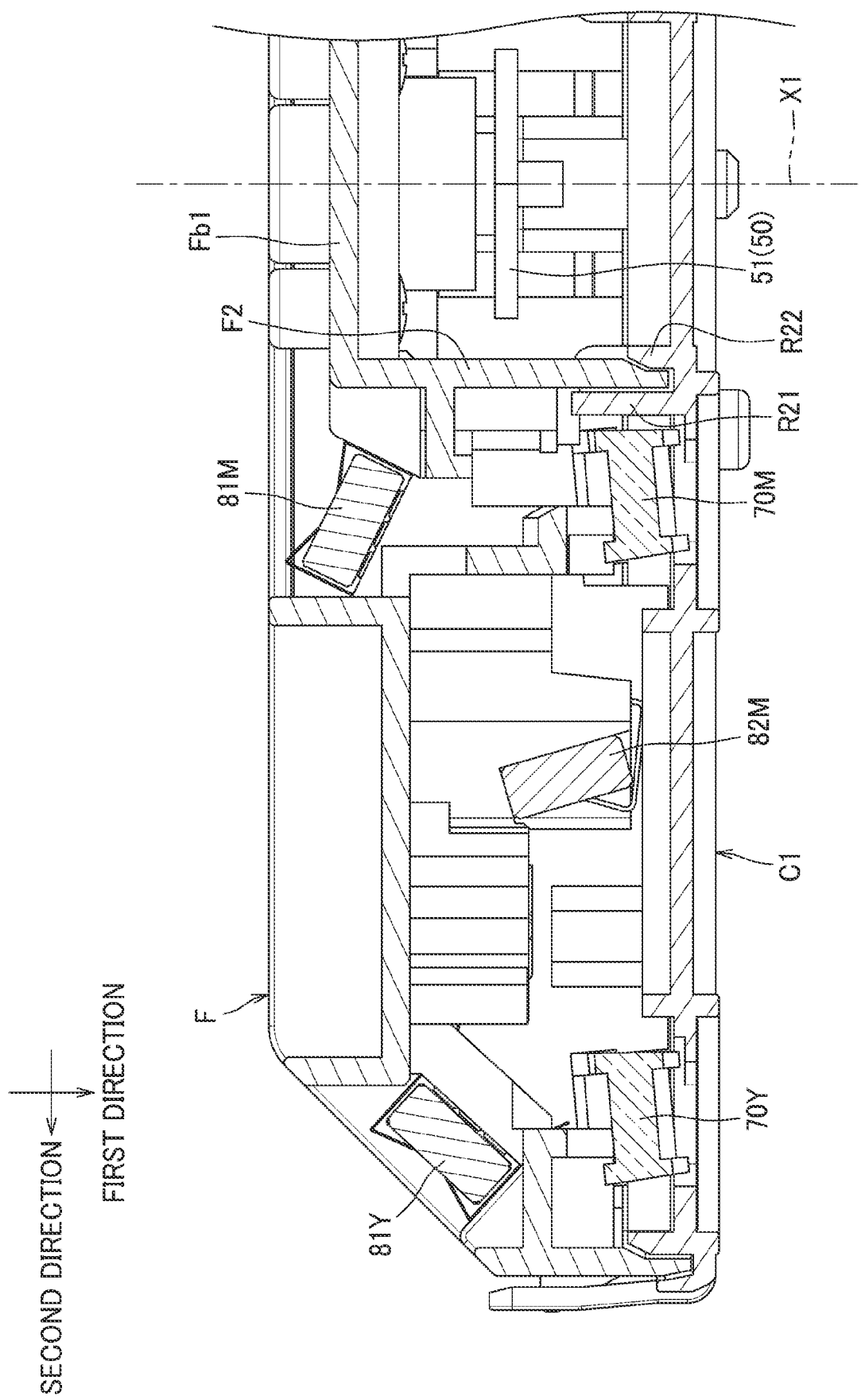
FIG. 12 is a partial cross-sectional view of the scanning optical device, showing a second rib of the first cover.

As shown in FIG. 12, the first cover C1 includes two second ribs R21, R22. Each of the second ribs R21, R22 overlap at least a part of the second wall F2 as viewed in a direction in which a light beam travels before striking the first scan lens 60YM (see FIG. 13), i.e., the second direction. Each of the second ribs R21, R22 extends in the third direction. The distance between each of the second ribs R21, R22 and the second wall F2 is smaller than the thickness of the second wall F2. The two second ribs R21, R22 sandwich the second wall F2 in the second direction. The second rib R21 located farther than the second rib R22, from the polygon mirror 51, protrudes farther than the second rib R22, toward the first base wall Fb1. Two other second ribs R21, R22 are similarly provided in the first cover C1 to sandwich therebetween the second wall F2 located on the other side of the polygon mirror 51 at a distance from the polygon mirror in the direction opposite to the second direction.

Figure 13:
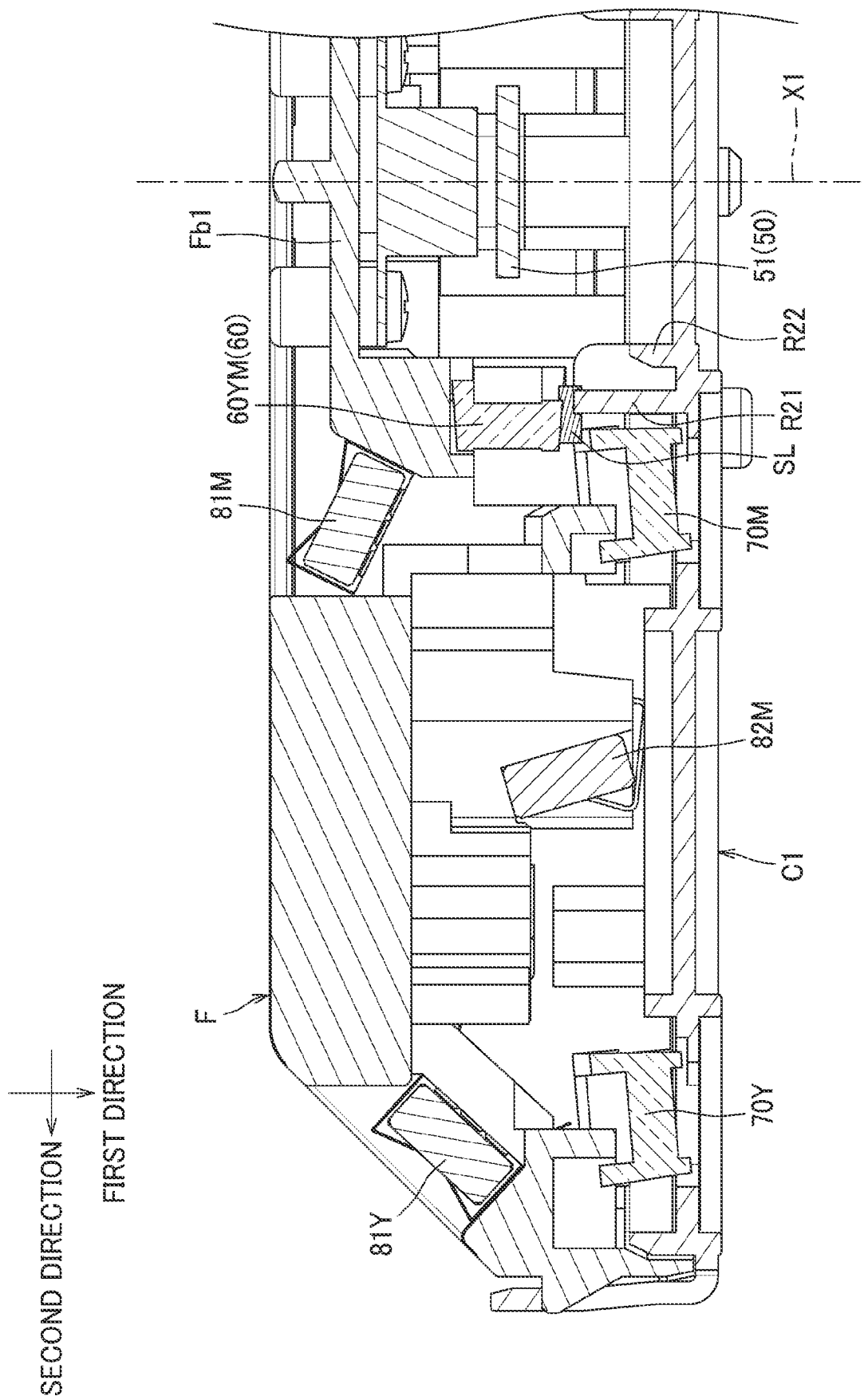
FIG. 13 is a partial cross-sectional view of the scanning optical device, showing a seal member located between the first cover and a first scan lens.

As shown in FIG. 13, the scanning optical device 1 further comprises a seal member SL located between the first scan lens 60YM and the second rib R21 of the first cover C1. The seal member SL is comprised of an elastic member such as a sponge. The seal member SL closes the second opening F21 (see FIG. 3) of the second wall F2 together with the first scan lens 60YM. Another seal member SL is similarly provided for the first scan lens 60CK located on the other side of the polygon mirror 51 at a distance from the polygon mirror in the direction opposite to the second direction.

Figure 14:
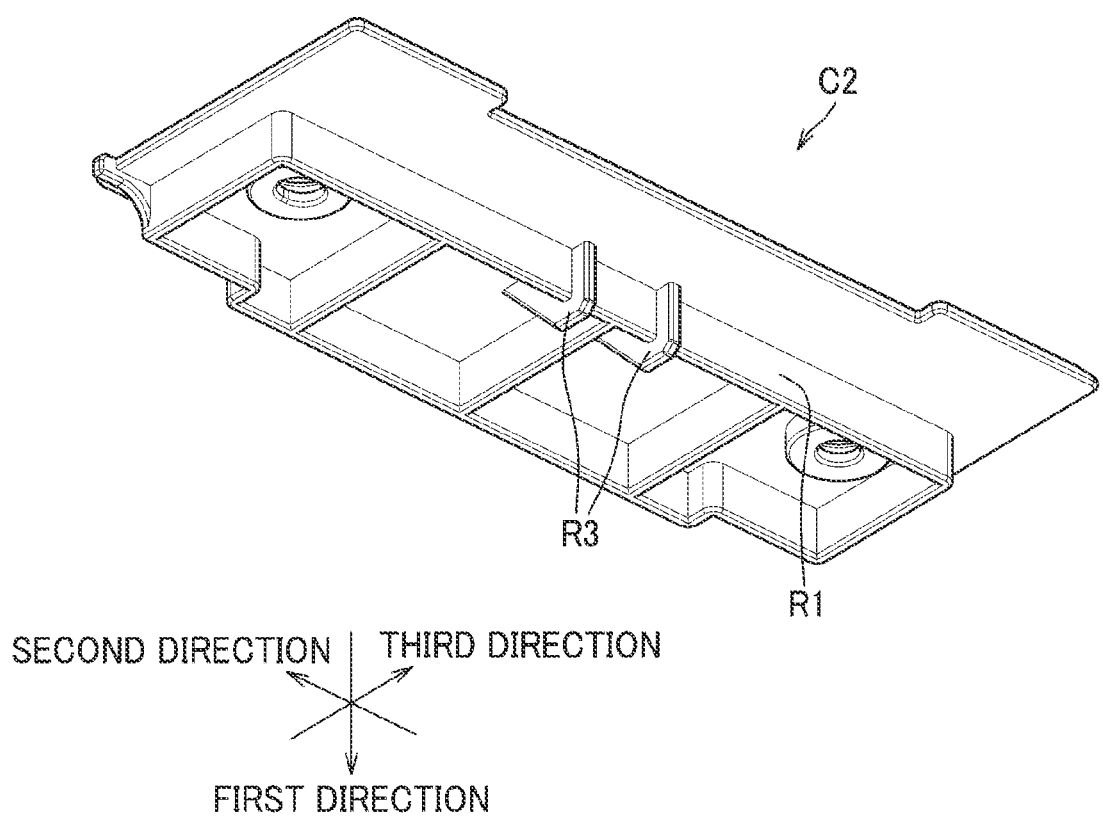
FIG. 14 is a perspective view of the second cover, showing an inner side thereof facing in the first direction.

As shown in FIG. 14, the second cover C2 includes a first rib R1 and two third ribs R3. The first rib R1 extends in the second direction. The two third ribs R3 are located in a central portion of the first rib R1 in the second direction, and are aligned and spaced apart from each other in the second direction. Each of the third ribs R3 protrudes farther than the first rib R1, toward the second base wall Fb2 (see FIG. 15).

As shown in FIG. 15, the first rib R1 overlaps at least a part of the first wall F1 as viewed in a direction in which a light beam travels before striking the condenser lens 40, i.e., the third direction. The distance between the first rib R1 and the first wall F1 in the third direction is equal to or smaller than the thickness of the first wall F1.

As shown in FIG. 4, the third ribs R3 overlap the first wall F1 as viewed in the third direction. The distance between each of the third ribs R3 and the first wall F1 is smaller than the thickness of the first wall F1. The third ribs R3 sandwich the condenser lens 40 together with the frame F.

Next, operations for adjustment of the position and/or orientation of members of the scanning optical device 1 will be described.

As shown in FIGS. 1 and 2, in order to adjust the position of the coupling lenses 20, an assembly jig holding the coupling lens 20 or the lens holder H21, H22 is inserted into the second recess CP2 in the first direction. Thus, the device for positional adjustment is positioned to face a side of the frame F facing in the direction opposite to the first direction.

When conducting a test by detecting a light beam to be received by the polygon mirror 51, a device for the test is inserted into the first recess CP1 in a direction opposite to the first direction. Thus, the device for the test is positioned to face a side of the frame F facing in the first direction.

When adjusting an angle of the reflecting mirrors 81, an assembly jig holding the reflecting mirrors 81 is brought into contact with the reflecting mirrors 81 in the first direction. Thus, the device for angular adjustment is located to face the side of the frame F facing in the direction opposite to the first direction. At this time, a light beam is detected by the device for the test positioned to face the side of the second scan lenses 70 facing in the first direction. This allows the device for detection of a light beam to be positioned to face the side of the frame F facing in the first direction, and the device for positional adjustment of the coupling lenses 20 and the device for angular adjustment of the reflecting mirrors 81 to be positioned to face the side of the frame F facing in the direction opposite to the first direction. Since the device for detection and the devices for adjustment can be positioned on opposite sides of the frame F, constraints imposed on a structure of manufacturing equipment can be reduced. Further, this allows positional adjustment of the coupling lenses 20 and the angular adjustment of the reflecting mirrors 81 to be performed successively while the frame F is fixed to the manufacturing equipment.

According to the above-described example, the following advantageous effects can be obtained.

Since the device for positional adjustment of the coupling lenses 20 can be located on one side of the frame F facing in the direction opposite to the first direction and the device for detection of a light beam received by the polygon mirror 51 can be located on the other side of the frame F facing in the first direction, constraints imposed on the structure of manufacturing equipment can be reduced.

Since the deflector 50 and the part of the scanning optical system Lo are located on the same side of the first base wall Fb1, the deflector 50 and the part of the scanning optical system Lo can be attached from the same side. Thus the scanning optical system Lo can be positioned accurately.

Since the scanning optical system Lo is configured to let out a light beam in the first direction, the light beam let out from the scanning optical system Lo can be measured from a side of the frame F opposite to a side on which the device for positional adjustment of the coupling lenses 20 is located.

Since the reflecting mirrors 81 are exposed to an outside of the frame F and accessible from a side of the first base wall Fb1 facing in the direction opposite to the first direction, the coupling lenses 20 and the reflecting mirrors 81 which need to be adjusted can be manipulated for adjustment from the same side.

Since the first cover C1 for covering sides of the deflector 50 and the first base wall Fb1 facing in the first direction is provided, dust can be restrained by the first cover C1 from adhering to the deflector 50.

Since the second cover C2 for covering sides of the coupling lenses 20 and the second base wall Fb2 facing in the direction opposite to the first direction is provided, dust can be restrained by the second cover C2 from adhering to the coupling lenses 20.

Since the rotation axis X1 of the polygon mirror 51 is located between the first screw N1 and the second screw N2 in the main scanning direction, airtightness of the portion of the frame F on which the deflector 50 is located may be improved.

Since the first openings F11, F12 through which light beams travel from the coupling lenses 20 toward the polygon mirror 51 are closed by the condenser lens 40, dust in the vicinity of the coupling lenses 20 can be restrained from moving toward the polygon mirror 51 and adhering to the polygon mirror 51.

Since the second cover C2 includes the first rib R1 that overlaps the first wall F1 as viewed from the third direction, airtightness between the first wall F1 and the second cover C2 can be improved.

Since the condenser lens 40 is sandwiched by the first wall F1 and the diaphragm 30, the condenser lens 40 can be placed in close contact with the first wall F1 to improve airtightness.

Since the second openings F21, F22 through which the light beams deflected by the polygon mirror 51 pass are closed by the first scan lenses 60YM, 60CK, dust in the vicinity of the scanning optical system Lo can be restrained from moving toward the polygon mirror 51 and adhering to the polygon mirror 51.

Since a seal member SL is provided between each of the first scan lenses 60YM, 60CK and the first cover C1, airtightness between each of the first scan lenses 60YM, 60CK and the first cover C1 can be improved.

Since the first cover C1 includes second ribs R21, R22 that overlap the second wall F2 as viewed from the second direction, airtightness between the first cover C1 and the second wall F2 can be improved.

The first cover C1 may cover the deflector 50 and at least a part of the scanning optical system Lo.

Since the first cover C1 covers the deflector 50 and a part of the scanning optical system Lo, both of the deflector 50 and the part of the scanning optical system Lo can be sealed by the first cover C1.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the part of the scanning optical system Lo is attached to one side of the first base wall Fb1 in the above-described example, the whole scanning optical system Lo may be attached to the one side of the first base wall Fb1.

Although the first side wall F41, the second side wall F42, the third side wall F43, and the forth side wall F44 are formed in the frame F in the above-described example, at least one of the four side walls may be formed on the cover.

The cover may be configured to cover at least a portion of the frame on which the deflector is positioned. For example, a cover for covering the deflector and a cover for covering the part of the scanning optical system may be configured as separate members. Further, the cover may cover the whole scanning optical system Lo. For example, if the whole scanning optical system Lo is contained in the first recess, the cover may cover the whole scanning optical system Lo.

Any number of the first ribs and any number of second ribs may be provided. Two first ribs may be provided to sandwich the first wall.

Although the frame F and the support member Fs including the seating surface FsZ are different members in the above-described example, the seating surface FsZ may be formed integrally with the frame F.

The semiconductor lasers 10 may be configured to include a plurality of light emission points. In this case, a plurality of streams of light from each of the semiconductor lasers 10 are converted to a plurality of light beams by a single coupling lens 20, and the plurality of light beams form an image on a surface of the photosensitive drum 200 by a corresponding scanning optical system Lo. In such configuration, each of the light beams BY, BM, BC, BK will include a plurality of light beams.

Although a scanning optical device applied to a multi-color image forming apparatus is given as an example in the above-described example, the scanning optical device may be applied to a monochrome image forming apparatus configured to use only one light beam for scanning an image plane.

The elements described in the above example embodiments and its modified examples may be implemented selectively and in combination.

What is claimed is:

1. A scanning optical device comprising:
    a semiconductor laser configured to emit light;
    a coupling lens configured to convert the light emitted by the semiconductor laser to a light beam;
    a condenser lens through which to concentrate the light beam received from the coupling lens in a sub scanning direction;
    a deflector including a polygon mirror configured to deflect the light beam received from the condenser lens in a main scanning direction;
    a scanning optical system configured to direct the light beam deflected by the deflector toward an image plane;
    a frame to which the deflector and the scanning optical system are fixed; and
    a first cover arranged to cover at least a portion of the frame on which the deflector is located; and
    a second cover arranged to cover at least a portion of the frame on which the coupling lens is located,
    wherein the frame includes a first wall having a first opening through which a light beam traveling toward the polygon mirror passes,
    wherein the condenser lens closes the first opening, and
    wherein the second cover includes a first rib that overlaps at least a part of the first wall as viewed in a direction in which a light beam entering the condenser lens travels.

2. The scanning optical device according to claim 1, wherein
    the frame comprises a diaphragm located between the coupling lens and the condenser lens, the diaphragm having an aperture stop through which a light beam from the coupling lens passes, and
    the condenser lens is sandwiched between the first wall and the diaphragm.

3. The scanning optical device according to claim 1, wherein
    the frame includes a second wall having a second opening through which the light beam reflected by the polygon mirror passes, and
    the scanning optical system comprises a plurality of scan lenses of which a scan lens closest to the polygon mirror closes the second opening.

4. The scanning optical device according to claim 3, further comprising a seal member located between the scan lens and the first cover.

5. The scanning optical device according to claim 3, wherein the first cover includes a second rib that overlaps at least a part of the second wall as viewed in a direction in which a light beam entering the scan lens travels.

6. The scanning optical device according to claim 1, wherein
    the scanning optical system is located on one side of the polygon mirror at a distance from the polygon mirror in a second direction perpendicular to a first direction parallel to a rotation axis of the polygon mirror,
    the scanning optical device further comprises a first screw and a second screw to fix the first cover to the frame, and the rotation axis is located between the first screw and the second screw in a third direction perpendicular to the first direction and to the second direction.

7. The scanning optical device according to claim 6, further comprising at least one other semiconductor laser and at least one other coupling lens,
wherein two light beams let out through two coupling lenses are located apart from each other in the second direction, and
the first screw is located between paths of the two light beams.

8. The scanning optical device according to claim 1, wherein the first cover covers the deflector and at least a part of the scanning optical system.

9. The scanning optical device according to claim 1, wherein the frame comprises:
a first base wall having:
a first side facing in a first direction parallel to a rotation axis of the polygon mirror; and
a second side facing in a direction opposite to the first direction; and
a second base wall having:
a first side facing in the first direction; and
a second side facing in the direction opposite to the first direction,
wherein the second base wall is located on one side of the first base wall at a distance from the first base wall in the first direction,
wherein the deflector is positioned on the first side of the first base wall, and
wherein the coupling lens is positioned on a side of the second side of the second base wall.

10. The scanning optical device according to claim 1, further comprising at least one other semiconductor laser and at least one other coupling lens, the semiconductor lasers comprising a first semiconductor laser configured to emit light, and a second semiconductor laser configured to emit light and located apart from the first semiconductor laser in the sub scanning direction, the coupling lenses comprising a first coupling lens configured to convert the light emitted by the first semiconductor laser to a light beam, and a second coupling lens configured to convert the light emitted by the second semiconductor laser to a light beam,
wherein the condenser lens concentrates the light beam from the first coupling lens and the light beam from the second coupling lens in the sub scanning direction.

11. The scanning optical device according to claim 1, further comprising at least one other semiconductor laser and at least one other coupling lens, the semiconductor lasers comprising a first semiconductor laser configured to emit light, and a second semiconductor laser configured to emit light and located apart from the first semiconductor laser in a direction perpendicular to the sub scanning direction and to a direction in which a light beam entering the condenser lens travels, the coupling lenses comprising a first coupling lens configured to convert the light emitted by the first semiconductor laser to a light beam, and a second coupling lens configured to convert the light emitted by the second semiconductor laser to a light beam,
wherein the condenser lens concentrates the light beam from the first coupling lens and the light beam from the second coupling lens in the sub scanning direction.

12. The scanning optical device according to claim 1, wherein the condenser lens includes a lens rib protruding in a direction in which a light beam entering the condenser lens travels, the lens rib being in contact with the first wall.

13. A scanning optical device comprising:
a semiconductor laser configured to emit light;
a coupling lens configured to convert the light emitted by the semiconductor laser to a light beam;
a deflector including a polygon mirror configured to deflect the light beam received from the coupling lens, the polygon mirror having a rotation axis;
a scanning optical system configured to direct the light beam deflected by the deflector toward an image plane; and
a frame to which the deflector is fixed,
wherein the frame comprises:
a first recess that opens in a first direction parallel to the rotation axis of the polygon mirror;
a second recess that opens in a direction opposite to the first direction,
a first base wall located at a bottom of the first recess; and
a second base wall located at a bottom of the second recess and located on one side of the first base wall at a distance from the first base wall in the first direction,
wherein the deflector is located in the first recess,
wherein the coupling lens is located in the second recess, and
wherein the polygon mirror is located between the first base wall and the second base wall in the first direction.

14. The scanning optical device according to claim 13, wherein at least a part of the scanning optical system is attached to the first base wall on the one side of the first base wall.

15. The scanning optical device according to claim 13, wherein the light beam from the scanning optical system is directed in the first direction toward an image plane.

16. The scanning optical device according to claim 13, wherein
the scanning optical system comprises a reflecting mirror arranged to reflect a light beam toward an image plane, and
wherein the reflecting mirror is exposed to an outside of the frame and accessible from a side of the first base wall facing in the direction opposite to the first direction.

17. The scanning optical device according to claim 13, further comprising a first cover arranged to cover a side of the deflector facing in the first direction and a side of the first base wall facing in the first direction.

18. The scanning optical device according to claim 17, further comprising a second cover arranged to cover a side of the coupling lens facing in the direction opposite to the first direction and a side of the second base wall facing in the direction opposite to the first direction.

19. The scanning optical device according to claim 17, wherein
the scanning optical system is located on one side of the polygon mirror at a distance from the polygon mirror in a second direction perpendicular to the first direction, a light beam deflected by the polygon mirror in a main scanning direction perpendicular to the first direction and to the second direction entering the scanning optical system,
the scanning optical device further comprises a first screw and a second screw to fix the first cover to the frame, and
the rotation axis is located between the first screw and the second screw in the main scanning direction.

20. A scanning optical device comprising:
a semiconductor laser configured to emit light;
a coupling lens configured to convert the light emitted by the semiconductor laser to a light beam;
a condenser lens through which to concentrate the light beam received from the coupling lens in a sub scanning direction;
a deflector including a polygon mirror configured to deflect the light beam received from the condenser lens in a main scanning direction;
a scanning optical system configured to direct the light beam deflected by the deflector toward an image plane;
a frame to which the deflector and the scanning optical system are fixed; and
a first cover arranged to cover at least a portion of the frame on which the deflector is located,
wherein the frame includes a first wall having a first opening through which a light beam traveling toward the polygon mirror passes,
wherein the condenser lens closes the first opening,
wherein the frame includes a second wall having a second opening through which the light beam reflected by the polygon mirror passes,
wherein the scanning optical system comprises a plurality of scan lenses of which a scan lens closest to the polygon mirror closes the second opening, and
wherein the first cover includes a rib that overlaps at least a part of the second wall as viewed in a direction in which a light beam entering the scan lens travels.

* * * * *